(12) United States Patent
Visvardis et al.

(10) Patent No.: US 10,274,533 B1
(45) Date of Patent: Apr. 30, 2019

(54) PRE-COMPUTATION SYSTEM AND METHOD FOR TRANSITION DOMAIN CHARACTERIZATION WITHIN A FLOATING RANDOM WALK BASED MULTI-DIELECTRIC CAPACITANCE EXTRACTION METHODOLOGY

(71) Applicant: Helic, Inc., San Jose, CA (US)

(72) Inventors: Marios Visvardis, Athens (GR); Errikos Lourandakis, Athens (GR); Stefanos Stefanou, Athens (GR)

(73) Assignee: Helic, Inc., San Jose, CA (US)

( * ) Notice: Subject to any disclaimer, the term of this patent is extended or adjusted under 35 U.S.C. 154(b) by 620 days.

(21) Appl. No.: 14/715,267

(22) Filed: May 18, 2015

(51) Int. Cl.
*G01R 31/26* (2014.01)

(52) U.S. Cl.
CPC .................................. *G01R 31/26* (2013.01)

(58) Field of Classification Search
CPC ............ G06F 17/5036; G06F 17/5081; G06F 17/5018; H01L 23/53295; H01L 23/522
See application file for complete search history.

(56) References Cited

U.S. PATENT DOCUMENTS 7,096,441 B2    8/2006  Lo
8,122,419 B2 *  2/2012  Elfadel ............... G06F 17/5036
                                                      716/104

(Continued)

OTHER PUBLICATIONS

T.A. El-Moselhy, "Field Solver Technologies for Variation-Aware Interconnect Parasitic Extraction", PhD Thesis, Massachusetts Institute of Technology, 2010 (213 pages).*

(Continued)

*Primary Examiner* — Tri M Hoang
(74) *Attorney, Agent, or Firm* — Shami Messinger PLLC

(57) ABSTRACT

An apparatus for performing multi-tier domain pre-characterization for floating random walk capacitance extraction of a semiconductor structure includes a processor configured to recursively execute a floating random walk algorithm, over a plurality of points for a plurality of conductors, to permit determination of a potential at a plurality of points on a Gaussian surface around each of a plurality of conductors and determination of a coupling capacitance between the plurality of conductors, each iteration of the floating random walk algorithm comprising selection of a domain about an initial boundary point on the Gaussian surface of the respective one of the plurality of conductors and determination of a new boundary point on the new domain, from which a successive boundary point is selected with a corresponding successive domain centered thereabout, this process continuing until a corresponding successive domain terminates at a boundary having a known potential, whereupon the processor determines the potential at the initial boundary point on the Gaussian surface of the respective one of the plurality of conductors, wherein at least one domain during each floating random walk is matched by the processor to one of a plurality of pre-characterized domains, the matching of the selected domain with the one of a plurality of pre-characterized domains utilizing a smart sweep method, a single dielectric method, a two-dielectric method, a three-dielectric method or an averaging method.

27 Claims, 18 Drawing Sheets

(56) References Cited

U.S. PATENT DOCUMENTS

| | | | |
|---|---|---|---|
| 8,195,439 | B1 | 6/2012 | Hussain |
| 8,250,506 | B2 | 8/2012 | Bantas |
| 8,453,102 | B1 | 5/2013 | Pack |
| 8,468,482 | B1 | 6/2013 | Pack |
| 8,478,553 | B2 | 7/2013 | Charlet |
| 2008/0216035 | A1 | 9/2008 | Dirks |
| 2010/0122223 | A1* | 5/2010 | Elfadel .............. G06F 17/5036 716/136 |
| 2014/0183692 | A1 | 7/2014 | Yeh |
| 2015/0074629 | A1 | 3/2015 | Chen |
| 2015/0128102 | A1 | 5/2015 | Perry |
| 2016/0180007 | A1* | 6/2016 | Svizhenko ......... G06F 17/5036 716/132 |

OTHER PUBLICATIONS

Zhang, B., Yu, W., and Zhang, C. (2016) Improved pre-characterization method for the random walk based capacitance extraction of multi-dielectric VLSI interconnects. Int. J. Numer. Model., 29: 21-34. doi: 10.1002/jnm.2042.*

Yu et al., "RW Cap: A Floating Random Walk Solver for 3-D Capacitance Extraction of Very Large Scale Integration Interconnects", IEEE Transactions on CAD of IC and Systems, vol. 32, No. 3, Mar. 2013.*

S. H. Batterywala et al., "Variance Reduction in Monte Carlo Capacitance Extraction", In VLSI Design, pp. 85-90, IEEE Computer Society, 2005.

M.P. Desai, et al., "An Efficient Capacitance Extractor Using Floating Random Walks", PhD Thesis, Indian Institute of Technology, 1998 (24 pages).

C. Zhang et al., "Efficient Space Management Techniques for Large-Scale Interconnect Capacitance Extraction with Floating Random Walks", IEEE Trans. on CAD of Integrated Circuits and Systems, vol. 32, No. 10, pp. 1633-1637, 2013.

C. Zhang et al., "Efficient Techniques for the Capacitance Extraction of Chip-Scale vlsi Interconnects Using Floating Random Walk Algorithm", In ASP-DAC, pp. 756-761, 2014.

H. Zhuang et al., "Fast Floating Random Walk Algorithm for Multi-Dielectric Capacitance Extraction with Numerical Characterization of Green's Functions," In ASP-DAC, pp. 377-382, IEEE, 2012.

W. Yu et al., "Rwcap: A Floating Random Walk Solver for 3-D Capacitance Extraction of Very-Large-Scale Integration Interconnects," IEEE Trans. on CAD of Integrated Circuits and Systems, vol. 32, No. 3, pp. 353-366, 2013.

W. Yu et al., "Accelerated Floating Random Walk Algorithm for the Electrostatic Computation with 3-D Rectilinear-Shaped Conductors," Simulation Modelling Practice and Theory, vol. 34, pp. 20-36, 2013.

"SESS Rapid3D 20X Performance Improvement," *Synopsys Predictable Success*, Greg Rollins, Jul. 19, 2010, pp. 1-12 (Power Point slideshow) (12 pages).

"StarRC Custom Rapid3D Extraction—Next Generation high Performance 3D Fast Field Solver," Shah, et al., *Synopsys Predictable Success*, Jun. 2010, pp. 1-7 (7 pages).

"F3D—Fast Accurate 3D RC Extraction," *Silicon Frontline Technology*, info@siliconfrontline.com (4 pages).

Chapter 6—"Background on Floating Random Walk (FRW)," pp. 117-122 (6 pages).

"A Stochastic Algorithm for High Speed Capacitance Extraction in Integrated Circuits," Y.L. Le Coz et al., *Solid-State Electronics*, vol. 35, No. 7, pp. 1005-1012, 1992 (8 pages).

"A Floating Random-Walk Algorithm for Extracting Electrical Capacitance," Ralph B. Iverson, et al., *Mathematics and Computers in Simulation*, 55 (2001), pp. 59-66 (8 pages).

* cited by examiner (a) Random walk transitions (b) Monte Carlo integration along the transitions (a) Uniform dielectric (b) Multiple dielectrics

PRE-COMPUTATION SYSTEM AND METHOD FOR TRANSITION DOMAIN CHARACTERIZATION WITHIN A FLOATING RANDOM WALK BASED MULTI-DIELECTRIC CAPACITANCE EXTRACTION METHODOLOGY

BACKGROUND OF THE INVENTION

Integrated circuits are designed in a hierarchical manner with building blocks that are used multiple times and connected to each other to perform certain logical functions. Each block or cell consists of active devices and wires connecting them together to form a circuit. Design of integrated circuits takes place in a computer using geometrical shapes representing the individual masks required to fabricate the integrated circuit. The geometrical shapes comprising the layout of the integrated circuit are embedded between successive layers of dielectrics, the technology stack up, forming a three-dimensional structure Todays integrated circuits consist of billions of devices and interconnect lines. Devices can be classified as actives and passives. Radio frequency (RF) circuits utilise both active and passive devices and interconnects between them. Passive devices such as integrated inductors are essentially interconnect lines with specific layout designed to produce the same electrical properties as their discrete off-chip counterparts. Therefore, they need to be treated in different manner when extraction and verification of the layout of the design is performed prior to fabrication. Such devices may require different extraction and verification steps to ensure accuracy is achieved in the desired frequency of operation.

Historically, off-chip passive devices were modeled by compact models based on closed form expressions and were good enough to model the device behaviour at Printed Circuit Board (PCB) level. Integration of such devices for RF circuit designs requires a distributed model to accurately model electromagnetic effects in gigahertz range frequencies. Model extraction of such devices takes place in the form of a SPICE equivalent RLCk electric network. The estimation of the parasitic capacitance of passive devices and interconnects plays a crucial role in the modeling of the high frequency performance and behaviour of each individual device and the entire circuit Parasitic extraction and verification is dominated by pattern matching methods employed by commercially available solvers. The integrated circuit is divided into patterns which are matched to a database of precomputed/pre-solved patterns. Other analytical methods that are not based on pattern matching included discretization-based or discretization-free solvers. The former are limited by the size of the integrated circuit. Memory requirements and solution times can be high and prohibitive to very large integrated circuits. Discretization-free solvers are mainly stochastic and bear the advantage a small memory footprint, rapid solution times and predictability of accuracy.

The floating random walk method for capacitance extraction has been utilised in VeloceRaptor/X, manufactured by Helic, Inc. of San Jose, Calif. The accuracy of the algorithm depends on pre-characterised random walk transition domains. Pre-characterisation of all possible combinations of dielectric layers for all transition domain sizes is prohibitive. Classification of the transition domains in such manner so that only those mostly likely to be needed by the random walk algorithm are initially precomputed and stored to memory, improves the accuracy and convergence time of the method. A multi-tier system and method for multi-dielectric transition domain pre-characterisation is presented.

BRIEF DESCRIPTION OF THE DRAWINGS

The foregoing and other advantages of the disclosure will become apparent upon reading the following detailed description and upon reference to the drawings.

Figure 1:
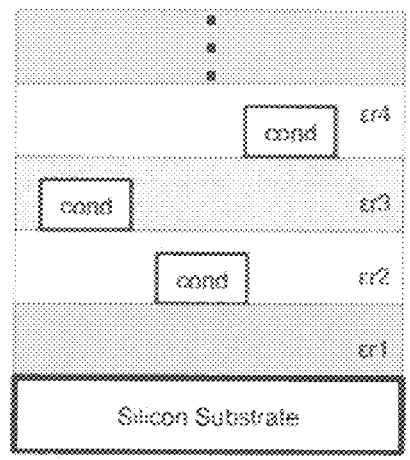
FIG. 1 shows a simplified cross section of CMOS BEOL technology stack-up.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

SUMMARY OF THE INVENTION

The aspects of the present concepts disclosed herein are generally directed to solid-state device capacitance extraction methodology and systems.

In one aspect, the present concepts include an apparatus for performing multi-tier domain pre-characterization for floating random walk capacitance extraction of a semiconductor structure comprising one or more dielectric layers, comprising a processor, a user interface and a physical, non-transient memory device, wherein the user interface is configured to permit a user to input a semiconductor structure model and to store said semiconductor structure model in the physical, non-transient memory device, and wherein the processor is configured to recursively execute a floating random walk algorithm, over a plurality of points for a plurality of conductors, to permit determination of a potential at a plurality of points on a Gaussian surface around each of the plurality of conductors and determination of a coupling capacitance between the plurality of conductors. Each iteration of the floating random walk algorithm comprises selection of a domain about an initial boundary point on the Gaussian surface of the respective one of the plurality of conductors and determination of a new boundary point on the new domain, from which a successive boundary point is selected with a corresponding successive domain centered thereabout. This process continues until a corresponding successive domain terminates at a boundary having a known potential, whereupon the processor determines the potential at the initial boundary point on the Gaussian surface of the respective one of the plurality of conductors. At least one domain during each floating random walk is matched by the processor to one of a plurality of pre-characterized domains, the matching of the selected domain with the one of a plurality of pre-characterized domains utilizing a smart sweep method, a single dielectric method, a two-dielectric method, a three-dielectric method or an averaging method. Each domain may comprise one or more dielectric layers.

The above summary of the present invention is not intended to represent each embodiment, or every aspect, of the present invention. Additional features and benefits of the present invention will become apparent from the detailed description, figures, and claims set forth below.

DETAILED DESCRIPTION

Capacitance extraction in the context of this document will be treated assuming operation under the electrostatic assumption. This statement sets the time varying parts ($\delta/\delta t=0$) in Maxwell's equations and as a result all expressions are functions of space and not time. Although strictly speaking the electrostatic equations are valid only for DC, they can also be used for quasi-static situations, where the largest device dimension of interest l remains below a small fraction of the guided wavelength $\lambda g$, or in a mathematical expression $l \leq 0.1 \lambda g$.

The basic Maxwell equation which will be used for capacitance extraction between perfect conductors is the Gauss's law and is given as $$\nabla \cdot D = \rho \rightarrow \nabla \cdot \varepsilon E = \rho, \quad (1.1)$$

where D is the electric flux density in (C/m$^2$), E the electric field strength in (V/m), $\rho$ the electric charge density in (C/m$^3$), and $\varepsilon$ the dielectric constant in the surrounding medium. In other words, the Gauss's law states that the total outward electric flux $\psi$ through a closed surface S is proportional to the charge enclosed by the volume defined by this surface. Expressing the Gauss's law in its integral form results in the following expression, which allows the evaluation of electric field by forming an imaginary surface around a conductor.

$$\psi = \oint \vec{E} \cdot \vec{dS} = \frac{q}{\varepsilon}. \quad (1.2)$$

FIG. 1 shows a general case with N conductors embedded in the back-end of line (BEOL) of a multilayer CMOS process. It is desired to know the amount of capacitive interaction between the conductors. This problem, the N-body problem, formulates the multiple interactions between N objects arbitrary distributed in space. This electrical system in electrostatically described by a capacitance matrix of the following form $$C = \begin{bmatrix} C_{11} & C_{12} & \ldots & C_{1N} \\ C_{21} & C_{22} & \ldots & C_{2N} \\ \vdots & \vdots & \vdots & \vdots \\ C_{N1} & C_{N2} & \ldots & C_{NN} \end{bmatrix}, \quad (1.3)$$

The positive diagonal elements are self-capacitances and the negative off-diagonal elements are coupling capacitances. One way to calculate the capacitive coupling of this arrangement of conductors is to perform N experiments by applying a DC voltage of 1V to conductor i and set all other N−1 conductors to ground potential 0V. Keeping the potentials to 1V and ground, respectively, allows characterization of the coupling capacitance Cij in terms of the available charge on conductor j. Cii self-capacitance is $\Sigma e_j ||C_{ij}|$.

Figure 2:
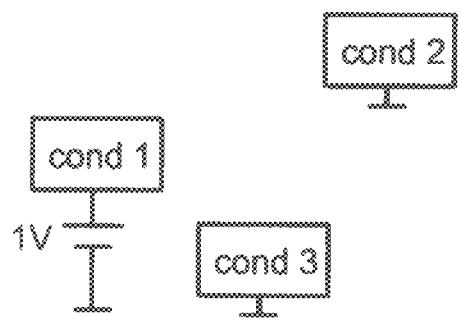
FIG. 2 shows an excitation scheme for calculating the first row of capacitance matrix C as given in Eq. (1.3).

For each pair of conductors i and j, their coupling capacitance will be $Cij=Q_i/\Delta V_{ij}=Q_j$ since the voltage difference between all pairs of conductor is $\Delta Vij=Vi-Vj=1V$. The capacitance calculation is thus a calculation of the total available charge on different conductors. As an example, FIG. 2 shows an excitation scheme for calculating the first row of capacitance matrix C of Eq. (1.3). In the same manner, the second row of the capacitance matrix is calculated by setting conductor 2 to 1V and all others to ground. Repeating this procedure N times with the described excitation scheme will result in the complete capacitance matrix.

Green's function can be used to describe the response of an electromagnetic system to a delta function source. Once the Green's function is known, the response to an arbitrary excitation can be obtained using superposition. For simplicity, where a local charge of density p is located at point $r_2$ in space the potential $\varphi$ caused at point $r_1$ is sought, with all objects being embedded in a uniform medium dielectric constant $\varepsilon$, it can be shown that the experiment is governed by the Poisson equation of electrostatics, given as $$\nabla^2 \phi(r) = \frac{\rho(r)}{\varepsilon}. \quad (1.4)$$

Its solution in the form of an integral equation is given by $$\phi(r_1) = \frac{1}{\varepsilon} \int_V G(r_1, r_2) \cdot \rho(r_2) \cdot dV, \quad (1.5)$$

where V is the volume V (x, y, z) domain. In general, the Green's function G may be defined as the effect produced by a source of unit intensity. The Green's function allows determination of the potential at a given point when the source excitation is known.

Unlike deterministic numerical methods, stochastic numerical methods (e.g., Monte Carlo methods) may be used to solve mathematical and physical problems. The Monte Carlo method treats mathematical problems with a probabilistic analog and then obtains the approximate answers to this analog by an experimental sampling procedure. As with all stochastic methods, Monte Carlo methods give solutions which are averages over a number of tests. For this reason, the solutions contain fluctuations about a mean values and it is impossible to ascribe a 100% confidence in the computed values. To evaluate the statistical uncertainty in Monte Carlo calculations, statistical techniques associated with random variables must be understood. If X is a random variable ruled by a certain probability density function (PDF), the expected or mean value x is given by the following expression $$\bar{x} = \int_{-\infty}^{\infty} x \cdot f(x) dx, \quad (1.6)$$

where f(x) is the probability density function of the random variable X. If random independent samples $x_1, x_2, \ldots, x_N$ from f(x) are picked, the estimate of x would take the form of the mean of N samples, namely, $$\hat{x} = \frac{1}{N} \sum_{n=1}^{N} x_n. \quad (1.7)$$

While x is the true mean values of X, $\hat{x}$ is the unbiased estimator of $\bar{x}$, an unbiased estimator being one with the correct expectation value. Although the expected value of $\hat{x}$ is equal to $\bar{x}$, the two metrics are not identical. This relation is governed by the law of large numbers, which states that by taking infinitely many samples, the error between the estimate and the expected value is statistically zero as both approaches converge to the right value as governed by equation 1.10.

$$\text{Probability}\left[E[x] = \lim_{N \to \infty} \frac{1}{N} \sum_{i=1}^{N} x_i\right] = 1. \quad (1.8)$$

To estimate the spread of values of X, and eventually of $\hat{x}$ about $\bar{x}$, the variance of X, defined as the expected value of the square of the deviation of X from $\bar{x}$, is introduced, which may be expressed as:

$$\sigma^2(x) = \overline{x^2} - \bar{x}^2 \to \sigma(x) = \sqrt{(\overline{x^2} - \bar{x}^2)} \quad (1.9)$$

which results in the square root of the variance (standard deviation), providing a measure of the spread of x about the mean value $\bar{x}$ and is a metric of the order of magnitude of the error. The relation between the variance of $\hat{x}$ and the variance of x is $$\sigma(\hat{x}) = \frac{\sigma(x)}{\sqrt{N}}. \quad (1.10)$$

The above concepts lend themselves to Monte Carlo integration. In evaluating the integral expression $I=\int_a^b f(x) dx$, the expected value of a function g(x) $(E[g(x)]\int_a^b g(x) p(x) dx$, where p(x) is the probability function), and approximation of the estimated value $$E[g(x)] \approx \frac{1}{N} \sum_{i=1}^{N} g(x_i),$$

Equation (1.14), below, can be derived and serve as a basis for the Random Walk method:

$$I = \int_a^b \frac{f(x)}{p(x)} p(x) dx \approx \frac{1}{N} \sum_{i=1}^{N} \frac{f(x_i)}{p(x_i)}. \quad (1.11)$$

At this point, the conditions for random choice are to be defined. First, every unit in the population must have an equal probability p of being chosen (the "Equal Likelihood Principle"). Second, there must be no way for an observer to predict which units are selected for the sample with any greater accuracy than p. To eliminate any bias, a sample that includes every possible combination of units from the sampling frame must be drawn. For normal distributions, it is easy to draw samples which follow the same probability distribution. In the general case of an arbitrary known distribution p(x) more sophisticated techniques such as, but not limited to, rejection sampling are presently preferred.

For rejection sampling, it is desired to sample along a known distribution function p(x) by picking values that will obey the probabilities given by p(x) via another easy-to-sample proposal distribution q(x) that satisfies p(x)≤M·q(x), M≤∞, using the following algorithm:
1. Set i=1
2. Repeat until i=N
3. Sample $x^{(i)} \sim q(x)$ and $u \sim U_{(0,1)}$
4. If $u < p(x^{(i)})/(M\, q(x^{(i)}))$ then accept $x^{(i)}$ and set i←i+1. Else reject.

Figure 3:
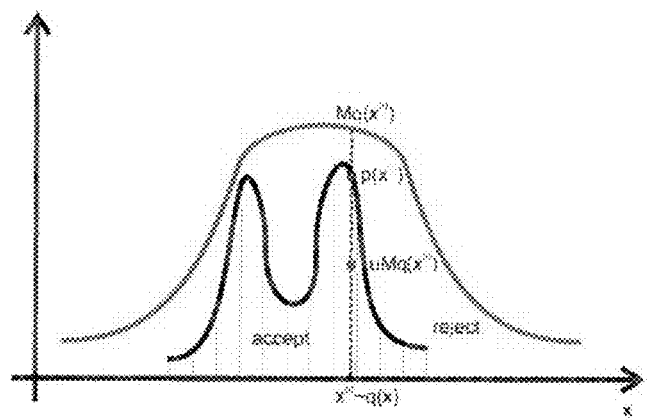
FIG. 3 shows rejection sampling in accord with some aspects of the present concepts showing sampling of a candidate $x^{(i)}$ and a uniform variable u, with acceptance of the candidate sample only where $uMq(x^{(i)}) < p(x^{(i)})$.

Graphically this concept is described in FIG. 3, which shows rejection sampling in accord with some aspects of the present concepts showing sampling of a candidate $x^{(i)}$ and a uniform variable u, with acceptance of the candidate sample only where $uMq(x^{(i)}) < p(x^{(i)})$ and where $u \sim U_{(0,1)}$ denotes the operation of sampling a uniform random variable on the interval (0,1). This method can suffer from limitations when the sampling space is large and multi-dimensional. It is not always possible to bound p(x)/q(x) with a reasonable constant M over the whole sampling space. If M is too large, the acceptance probability which is proportional to ~(1/M) will be too small. This makes the method impractical in high-dimensional scenarios.

The Floating Random Walk (FRW) algorithm is a stochastic method for solving the deterministic Laplace equation problem, which is subject to Dirichlet boundary conditions. In other words, the FRW computes the potential $\phi(r)$ at a point $r \in \Omega$, where $\Omega$ is the domain external to a group of conductors. In this domain each conductor is assigned to a known constant potential (e.g. 1V), and the boundary at infinity is assumed at zero potential. Generally, the FRW comprises recursively using the Green's function to express potential, at any point inside the domain $\Omega$, as linear combination of the known potential at the boundaries of $\Omega$. This idea is based on the observation that the potential $\phi(r)$ at any point in the domain can be expressed in terms of the potential $\phi(r^1)$ at the boundary of $S_1$ of a surrounding homogeneous sub-domain. Expressing this mathematically leads to:

$$\phi(r) = \int_{S_1} G(r,r^1) \cdot \phi(r^1) dr^1, \qquad (1.12)$$

where $G(r, r^1)$ is the Green's function derived from the solution of the Laplace equation with Dirichlet boundary conditions. Looking at the form of the integral equation, it is observed that the area under the Green's function has to be calculated for the transition from the center of the square domain to the point on its perimeter. Given the fact that the analytical Green's function is a rather complex expression, numerical integration techniques are considered. For example, a simplistic approximation would be to use a single trapezoidal shape spanning from a to b and approximate the area resulting from the initial integral $\int_a^b f(x)d(x)$ with following expression:

$$\int_a^b f(x)d(x) = (b-a)\frac{f(b)+f(a)}{2}. \qquad (1.13)$$

This approximation may result in errors and more accurate approximation is achieved by taking multiple steps and drawing the corresponding trapezoidal shapes, dividing the initial interval between a and b into segments of the following form: $a = x_0 \le x_1 \le x_2 \le \ldots \le x_n = b$, and transforming the integral calculation to following expression:

$$\int_a^b f(x)d(x) = \sum_{i=0}^{n-1} \frac{1}{2}(x_{i+1} - x_i)(f(x_{i+1}) + f(x_i)). \qquad (1.14)$$

In the same manner, the potential $\phi(r^1)$ is expressed in terms of the potential $\phi(r^2)$, which lies on the boundary S2 of another homogeneous domain enclosing the point $r^1$, thus $$\phi(r^1) = \int_{S_2} G(r^1, r^2) \cdot \phi(r^2) dr^2. \qquad (1.15)$$

Repeating this procedure recursively N-times until a known potential (e.g. $\phi(r^N)=1V$), is reached at the surface of another conductor will result in a chain of nested integrals that allows calculation of the potential at the starting point r, or in a mathematical expression $$\phi(r) = \int_{S_1} dr^1 \cdot G(r,r^1) \cdot \int_{S_2} dr^2 \cdot G(r^1,r^2) \times \ldots \times \int_{S_N} dr^N \cdot G(r^{N-1}, r^N) \cdot \phi(r^N). \qquad (1.16)$$

Figure 4:
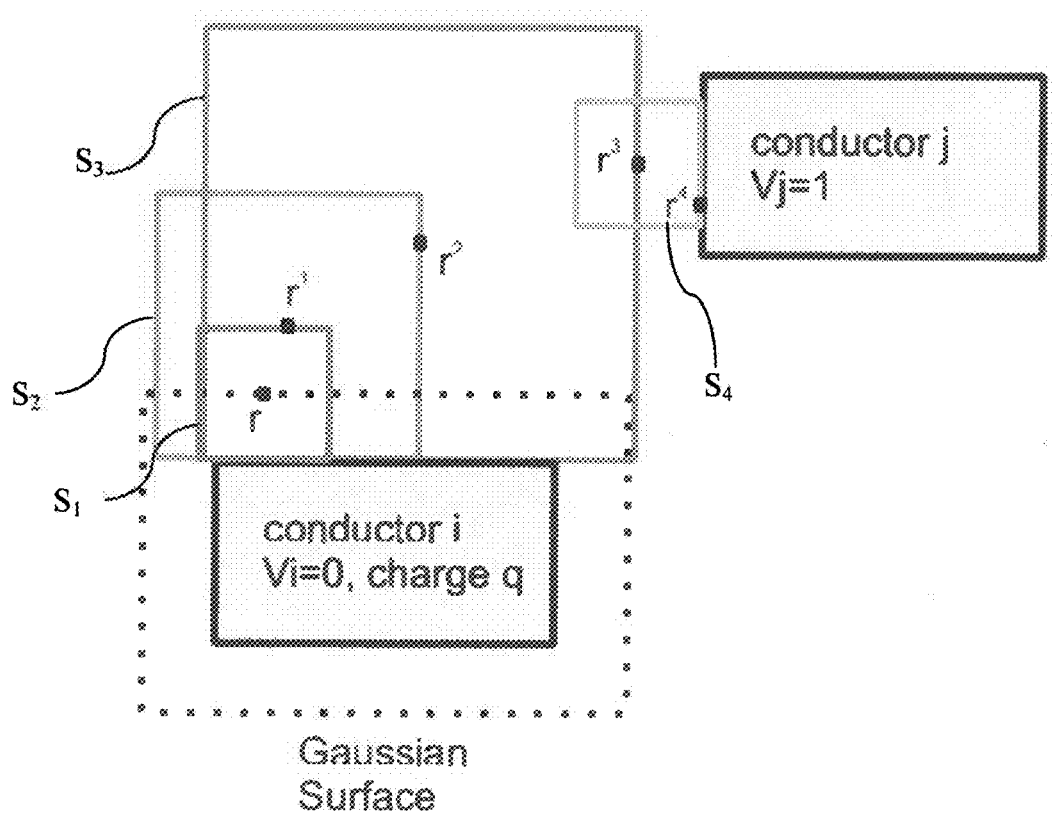
FIG. 4 shows an example of a Floating Random Walk (FRW) launched at initial point r on Gaussian surface of conductor i which terminates after 4 hops on conductor j which has a known potential, with $\varphi(r^4)=Vj=1$ in the example shown in accord with at least some aspects of the present concepts.
Figure 5A:
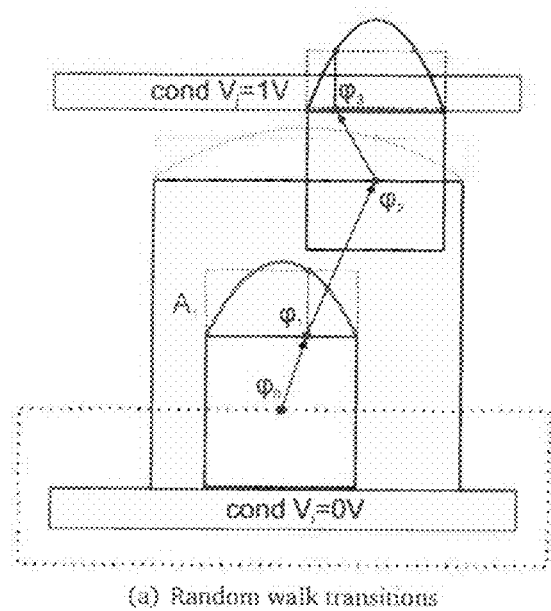
FIGS. 5(a)-5(b) show, respectively, examples of random walk transitions launched from Gaussian surface around victim conductor terminating on conductor of unit potential and a Monte Carlo integration along the transitions in accord with at least some aspects of the present concepts.
Figure 5B:
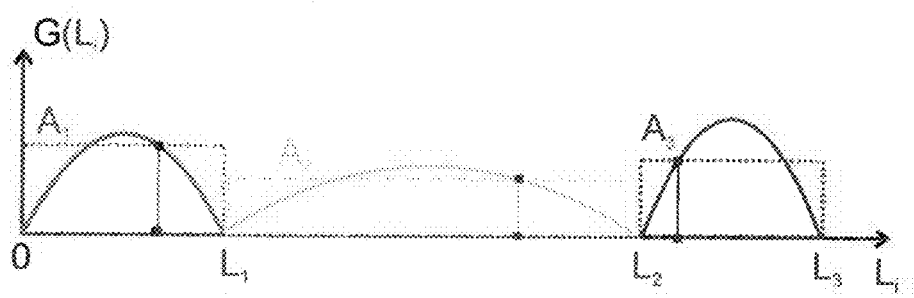

FIG. 4 assists with visualization of this concept and shows a representation of calculation of the potential at the initial point r on the Gaussian surface around conductor i. Starting from point r, a rectangle is drawn defining the first homogeneous domain $S_1$ and use a point $r^1$ on its surface to calculate the initial potential at point r. Since point $r^1$ is not on a boundary subject to Dirichlet conditions (e.g., a constant known potential zero or 1V), a second domain is drawn around $r^1$ which defines a new homogeneous region $S_2$ and the Green's function of the newly created domain is used to calculate the potential $\phi(r^1)$ in terms of a point $r^2$ on the surface of the new domain $S_2$. Again, since the potential $\phi(r^2)$ is not known, a new rectangle is drawn around point $r^2$, creating a new domain $S_3$, and so on, as many times as required until a termination is found at a boundary which has a known potential. By way of illustration and without limitation, FIG. 4 shows that, at the 4$^{th}$ hop, the potential at point $r^4$ is $\phi(r^4)=V_j=1V$. This known potential is substituted in Eq. (1.16) and for all intermediate domains the corresponding Green's function is used to calculate the initial potential $\phi(r)$, as shown in FIGS. 5(a)-5(b).

Applying Monte Carlo integration along the individual walks approximates at each step the change in the potential distribution with a single point integration on the Green's function, as $\phi_i = \int G(r_i, r_{i+1}) \cdot dr \cdot \phi_{i+1} \approx L_{i+1} \cdot G(L_{i+1}) \cdot \phi_{i+1}$, where $L_i$ is the domain size and $G(L_i)$ the Green's function at the transition point. Returning to the example of FIGS. 5(a)-5(b), where starting from the last step, it can be stated that $\phi_2 = L_3 \cdot A_3 \cdot \phi_3$, in the same way $\phi_1 = L_2 \cdot A_2 \cdot \phi_2$, and finally $\phi_0 = L_1 \cdot A_1 \cdot \phi_1$. In the general case, this procedure is repeated recursively for N hops, thus the calculated potential at the starting point $\phi_i$ is described in terms of the transitions and the target potential $\phi_N = 1$.

The charge enclosed by the Gaussian surface can be estimated by the electric field strength along the Gaussian surface of conductor I. Calculating the electric field strength at any point on the Gaussian surface from its potential is done by applying the ∇ operator E=−∇ϕ.

The Green's function in its general form $G(r^{i-1}, r^i)$ can be interpreted as a probability density function, since it is always positive, and since its integral over each domain $S_i$ is one. Such a probability density function can be interpreted as the probability of picking any point $r^i$ on the boundary $S_i$ of the homogeneous domain surrounding the point $r^{i-1}$. This probability density function will assume the meaning of a transition probability of moving from point $r^{i-1}$ to point In the floating random walk algorithm, the domain boundary $S_i$ is the boundary of the largest homogeneous square (2D) or cube (3D) having the point $r^{i-1}$ in its center, and not including any conductor. The domain $S_i$ will overlap partially with a conductor surface where the potential is known and this acts as a termination criterion for the algorithm.

Figure 6:
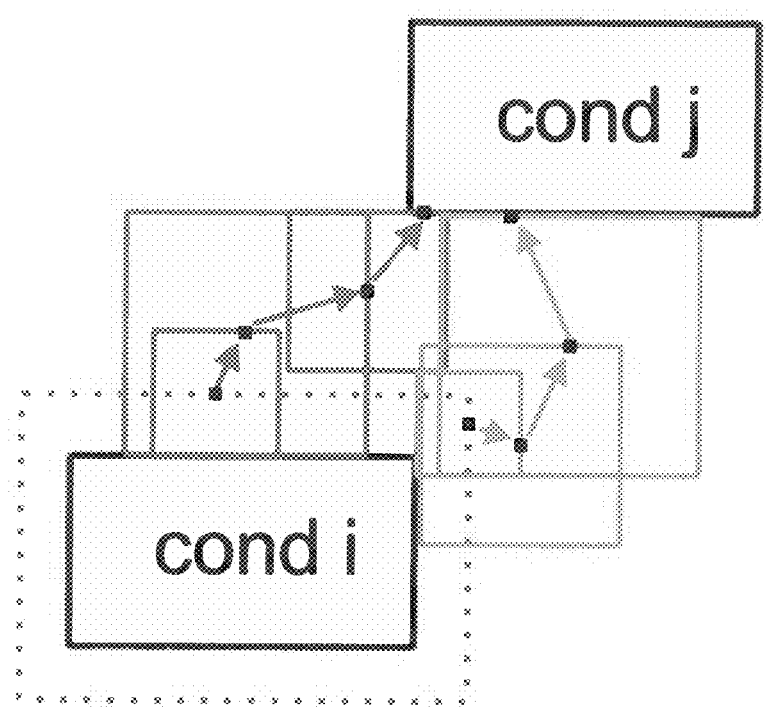
FIG. 6 shows an example of floating random walks launched from different points on a Gaussian surface around conductor i in accord with at least some aspects of the present concepts.

The sequence of selecting points on the boundary of different transition domains in accord with the present concepts can be interpreted as a random walk from a transition domain to another, whose stopping criterion is described above. The expected value of the potential is then given by $$E[\phi(r)] = \frac{1}{M}\sum_{m=1}^{M} \phi_m, \quad (1.17)$$

where E[·] is the expectation operator and $\phi_m$ is the potential obtained at the termination of the path m, and M is the total number of paths launched from the Gaussian surface around the conductor. Taking a large number of samples along the Gaussian surface provides a good estimation of the potential at point r, as described by Eq. (1.17). The above process can be expressed, by way of example, in the following pseudo code:

Floating Random Walk Algorithm
1. Initialize potential $\phi(r) \leftarrow 0$ and counter $M \leftarrow 0$
2. Pick a point r at which potential is to be computed
3. repeat
4. $M \leftarrow M+1$
5. $i \leftarrow 1$, $r^i \leftarrow r$, Path_Incomplete $\leftarrow$ true
6. while Path_Incomplete do
7. Construct a maximum square transition domain
8. Pick point $r^{i+1}$ on boundary according to transition probability G
9. if point $r^{i+1}$ has a known potential (lies on conductor boundary) then
10. $\phi(r) \leftarrow \phi(r) + \Phi$
11. Path_Incomplete $\leftarrow$ false
12. else
13. $i \leftarrow i+1$
14. end if
15. end while
16. until convergence achieved
17. $\phi(r) \leftarrow \phi(r)/M$ In view of the above, reference is now made to FIG. 6, wherein from each point on the Gaussian surface around conductor i random walks are launched until they terminate on the surface of another target conductor j. These walks may consist of different numbers of hops and may terminate at different points on the target conductor. Each walk contributes a unique electric field component $E_n$ and capacitive component $C_n$, at point n which is added for each point n. A convergence criterion for stopping this recursive algorithm could be a certain accuracy threshold above which adding more walks for point n, does not alter noticeably the electric field $E_n$ at this point. Repeating this procedure for the next points on the Gaussian surface would result in a good estimate of the total electrical field along the surface, and this is translatable to an estimation of the total enclosed charge and eventually the coupling capacitance between a pair of conductors. Capacitance extraction between any pair of conductors i and j from the procedure described above is obtained by setting conductor j to unit potential, all others to zero and by implementing the following calculation $$C_{ij} = q_{i|\phi_j=1} = \int_{S_0} \varepsilon \vec{E}(r)\cdot\hat{n}\,dr = \int_{SD_0}\varepsilon(-\nabla\phi(r))\cdot\hat{n}\,dr, \quad (1.18)$$

where $S_0$ is the Gaussian surface surrounding conductor i, $\hat{n}$ is the corresponding normal of the outward vector $\vec{n}$, and $\underline{E}(r)$ is the electric field vector. The potential $\phi(r)$ is computed as in Eq. (1.16) since it is the solution of the Laplace equation $\nabla^2\phi=0$ with Dirichlet boundary conditions. The final capacitance formula is then given as $$C_{ij} = -\int_{S_0} dr p_0 \int_{S_1} dr^1 \frac{\varepsilon\nabla_n G_1(r,r^1)}{p_0 G_1(r,r^1)} G_1(r,r^1) \times \quad (1.19)$$
$$\int_{S_2} dr^2 G_2(r^1,r^2) \times \ldots \times \int_{S_n} dr^n G_n(r^{n-1},r^n)\phi(r^n),$$

where the Green's function and the divergence operator $\nabla_n=\hat{n}\nabla$ of the Green's function can be calculated analytically for each transition domain. The first point of each path is randomly selected using a variable $p_0$ which follows a known distribution (e.g., a uniform distribution) around the closed Gaussian surface of conductor i. Rewriting Eq. (1.19) in a more compact manner results in the following expression for sampling of M points from the Gaussian surface $$C_{ij} = \frac{1}{M}\sum_{m=1}^{M}\omega_m\phi_m, \quad (1.20)$$

where for each of the m paths a weight function can be computed as $$\omega_m = \frac{\varepsilon\nabla_n G_1(r,r^1)}{p_0 G_1(r,r^1)}. \quad (1.21)$$

The potential $\phi_m$ at the end of the path is ruled by Dirichlet boundary conditions of the form $\phi_m=1$ when path m terminates on conductor j, else 0. Thus, only those weights terminating at a conductor with a voltage of 1 contribute to the specific capacitance. Convergence is deemed to occur when self-capacitance $C_{ii}$ does not change more than about 10% over the last 1000 walks. Alternatively, convergence is deemed to occur when a standard error is less than a user-defined value (typically 1%) over the last user-defined number of walks. The present concepts further contemplate other convergence criterion, or criteria, and the aforementioned examples are non-limiting. The procedure described here is in sync with the capacitance matrix concept discussed above. A single run of the floating random walk (FRW) around conductor i can provide all the entries of the corresponding column i of the capacitance matrix.

Figure 7:
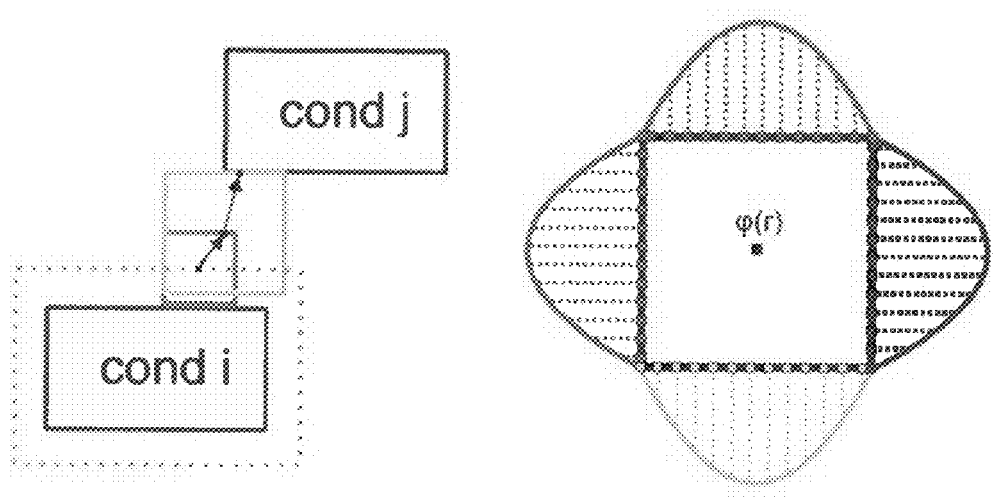
FIG. 7 show an example of a random walk launched on Gaussian surface of conductor i which terminates after two hops on conductor j (left) and transition probability distribution on each side of square domain according to Green's function (right) in accord with at least some aspects of the present concepts.

With regard to the above-described aspects of the floating random walk algorithm in accord with the present concepts, Step S of the FRW algorithm states that a point $r^{i+1}$ on the boundary of the transition domain has to be chosen, according to the Green's function, in order to calculate the potential $\phi(r)$ at the center point r of the square domain. In accord with at least some aspects of the present concepts, the strategy of choosing a point or points to begin the potential evaluation is discussed in greater detail below. In FIG. 7, for example, a random walk is launched from an initial point on the Gaussian surface around conductor i and is terminated on the surface of conductor j after two hops. As to which side of the square domain is selected each time a new square domain is drawn, it can be a random choice with equal possibilities of one of the four square domain faces. As to how to choose points on this side according to the Green's function, which describes the transition probability, the present concepts may use rejection sampling or equivalent sampling techniques to choose points on each boundary according to the transition probability.

The presence of different dielectrics along the conductors, as depicted in FIG. 30, affects the sampling procedure along the Gaussian surface. In this case the uniform distribution of the sampling points has to take into account the length of the individual segments along the surface and their permittivities.

Figure 8:
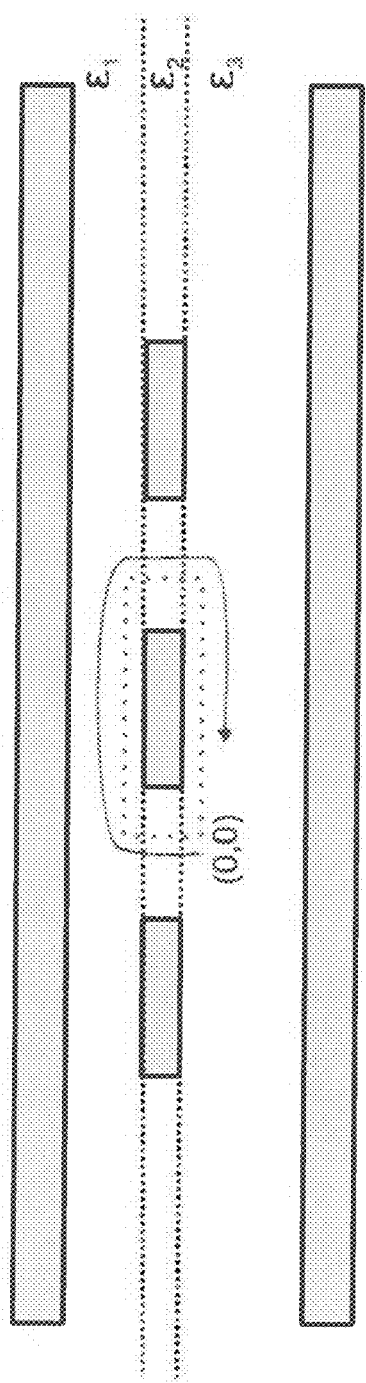
FIG. 8 shows a representation of a Gaussian surface around a conductor embedded in multiple dielectrics.
Figure 9:
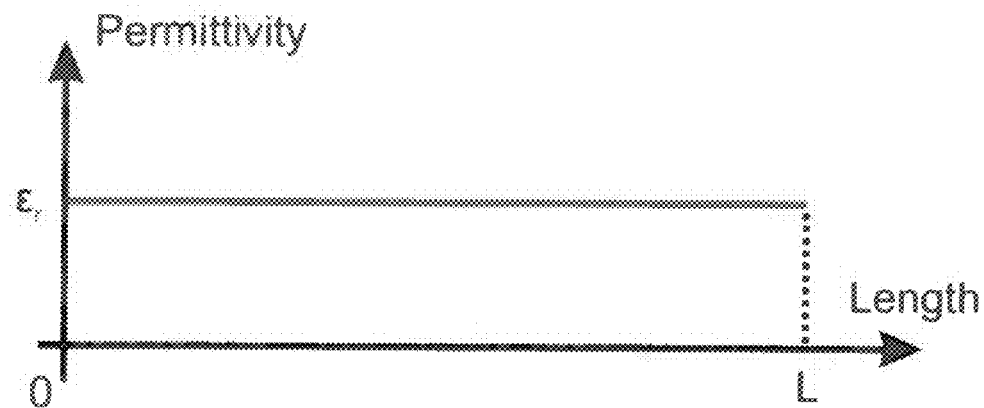
FIG. 9 shows an example of permittivity variation along a Gaussian surface for conductors embedded in uniform and multiple dielectrics.
Figure 9:
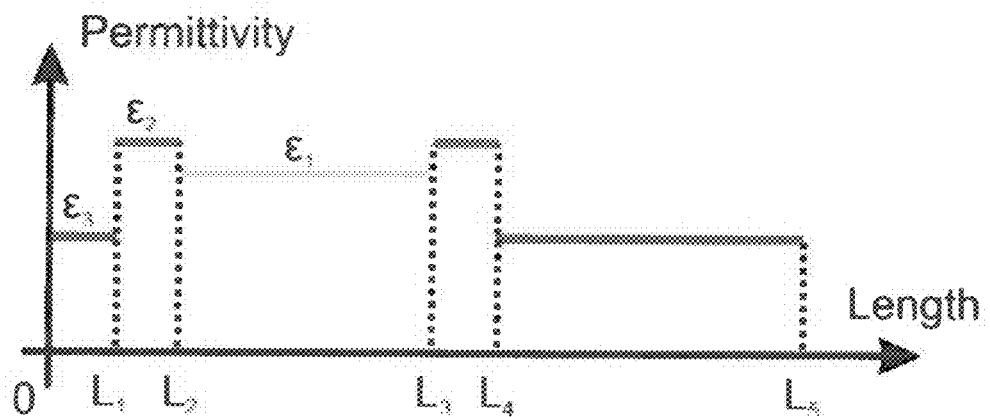

If the Gaussian surface around each conductor is denoted as $\Gamma$, and a random variable p0 is used to distribute uniformly the sampling points on $\Gamma$, it must be ensured that $\oint F(r) \cdot p_0 \cdot dl = 1$, where F (r) is the permittivity at point r along the Gaussian surface. With respect to FIG. 8, the permittivity variation can be described by a sum of several step functions as shown in FIG. 9, whereas for a uniform dielectric, the profile is flat along the Gaussian surface. For the uniform case the following integral equation is obtained:

$$\oint F(r) \cdot p_0 \cdot dl = 1 \rightarrow \varepsilon_r \cdot p_0 \cdot L = 1 \rightarrow p_0 = \frac{1}{\varepsilon_r \cdot L}. \quad (1.22)$$

The same calculation for the case of multiple dielectrics results in the following expression $$[\varepsilon_3 L_1 + \varepsilon_2(L_2 - L_1) + \varepsilon_1(L_3 - L_2) + \varepsilon_2(L_4 - L_3) + \varepsilon_3(L_5 - L_4)]p_0 = \quad (1.23)$$
$$1 \rightarrow p_0 = \frac{1}{\varepsilon_3 L_1 + \varepsilon_2(L_2 - L_1) + \varepsilon_1(L_3 - L_2) + \varepsilon_2(L_4 - L_3) + \varepsilon_3(L_5 - L_4)}.$$

From Eq. (1.23), it can be seen that, for a uniform dielectric surrounding the conductors (i.e., $\varepsilon_1 = \varepsilon_2 = \varepsilon_3 = \varepsilon_r$), the equation can be simplified to Eq. (1.22) and the new probability density function (PDF) $p_0$ describing a Gaussian surface around a conductor embedded in three dielectrics calculated. Applying rejection sampling on this PDF describes the probability of a sampling point to be in a region of a certain dielectric. In the general case, this approach can be extended to N-dielectrics.

The basic Floating Random Walk (FRW) algorithm, as discussed above, includes some advantages and disadvantages. On the positive side, the FRW algorithm has a variety of computational advantages. Foremost, the algorithm does not require any memory utilization, except for a single output capacitance matrix. This is very attractive since one of the main bottlenecks of deterministic algorithms is the large memory requirements, which in many cases makes efficient and accurate computations impossible. In addition, the random walk algorithm is inherently parallel, since the individual walks are statistically independent from each other and can be launched by different threads. Further, the algorithms exhibit a nearly linear scaling in computation time with respect to the number of CPU cores. However, even though a standard floating random walk algorithm can handle arbitrary layered media, achieved by treating the interfaces between the dielectric layers as constraints on the transition domain size and consequently as intermediate stopping points, current technologies with multiple thin layered dielectric configurations can render such an algorithm unduly burdensome and time consuming since the average transition domain size can become very small. This, in turn, requires reliance on pre-computing and tabulating of transition probabilities off-line, which values are then recalled during the actual walk. Unfortunately, this approach is limited to a small number of dielectrics and is hard to generalize since it requires the pre-computation and tabulation of the transition probabilities associated with all possible transition domains necessary to complete the random walk. Consequently, the trend has converged upon a deterministic numerical calculation (e.g., Finite Differences Method) of the Green's function in a multi-layer domain.

For transition domains containing only one dielectric, the Green's function and its gradient can be analytically calculated. For transition domains containing two or more dielectrics in arbitrary positions, the Green's function is approximated with numerical methods and, in accord with at least some aspects of the present concepts, Finite Differences Method (FDM) are utilized. The present concepts include FDM solvers using two different methods, both of which are based on the same electromagnetic background and generate the exact same results. The problem formulation and the implementation details differ though, as described below.

Figure 10:
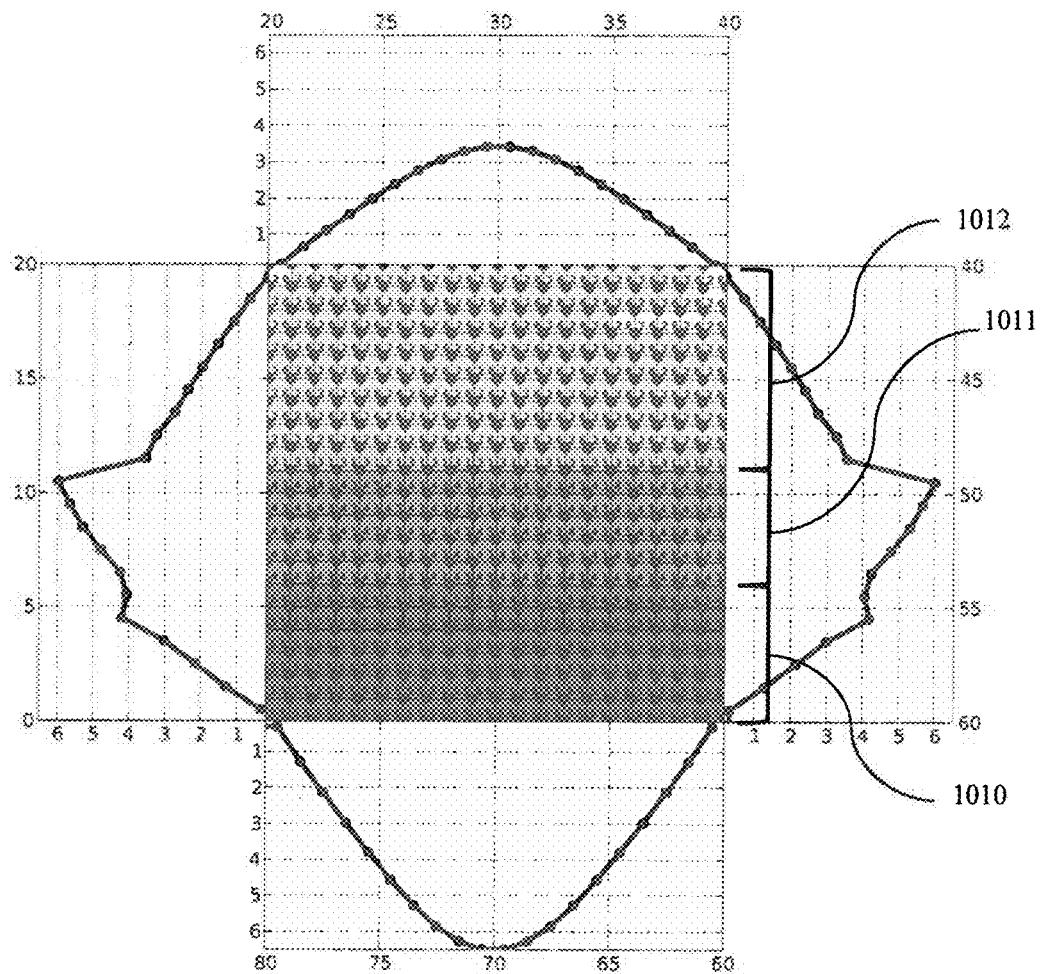
FIG. 10 shows the Green's function plotted around a domain with multiple planar dielectrics for a 21×21 Finite Differences Method (FDM) grid in accord with at least some aspects of the present concepts.

The first step needed before the Green's function calculation is the creation of a data structure to store the discretized domain information. A transition domain, discretized using a two dimensional 11×11 grid, is illustrated in FIG. 10, wherein the cells of regions 1010, 1011 and 1012 possess different dielectric permittivity values. For present purposes, only planar dielectric layers are considered. However, extending the FDM solver to support conformal dielectrics is straightforward.

A goal in accord with the present concepts is to specify the discrete probability density function for the transition from the center point of the domain to any point on the boundary. This probability is specified by calculating the potential at the center of the domain when only one of the boundary points is at a 1V potential, for all the boundary points. For each homogeneous sub-domain the Laplace equation for two dimensions holds:

$$\nabla^2 \Phi = \frac{\partial^2 \phi}{\partial x^2} + \frac{\partial^2 \phi}{\partial y^2} = 0 \quad (1.24)$$

Additionally, for all dielectric interfaces, the following continuous condition must be respected:

$$\varepsilon^+ \frac{\partial \phi}{\partial y^+}(p) = \varepsilon^- \frac{\partial \phi}{\partial z^-}(p) \quad (1.25)$$

for every point p on the dielectric interface.

Figure 11:
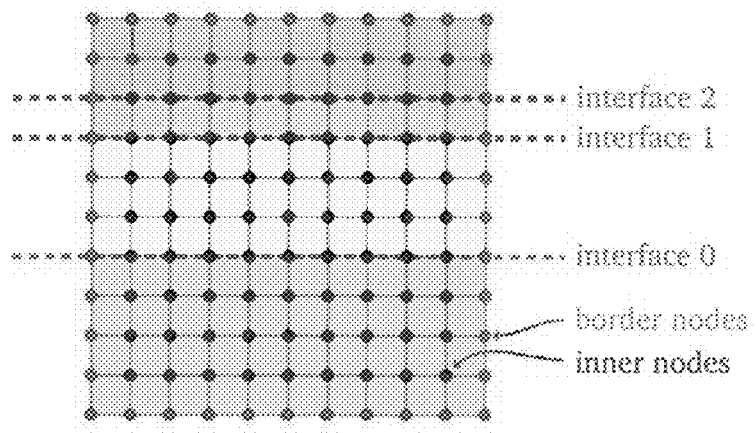
FIG. 11 is a domain representation, shown as a 11×11 grid, that is the discretization of the transition domain (11 points per edge) wherein each square in the grid can have different dielectric permittivity in accord with at least some aspects of the present concepts.
Figure 12:
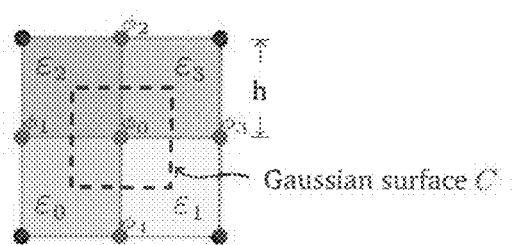
FIG. 12 is a generic stencil for the creation of the equation for an inner point of the grid of FIG. 11 in accord with at least some aspects of the present concepts.

In accord therewith, in the first method, or first solver, for each inner point in FIG. 11, an equation that relates its potential value with the potentials of its neighbors is created. Let $\phi_0$ be an arbitrary inner point in the FDM grid shown in FIG. 11. In the generic case, $\phi_0$ is surrounded by four areas with different dielectric permittivity each, as illustrated in FIG. 12 (a rectangular area C surrounding $\phi_0$ may also be considered). Based on Gauss's law, since there is no free charge enclosed by surface C, the net outward normal electric flux through C is equal to zero:

$$q = \oint_C \varepsilon \cdot E \cdot dl = 0 \Rightarrow -\oint_C \varepsilon \frac{\partial \phi}{\partial \hat{n}} \cdot dl = 0 \quad (1.26)$$

where $\hat{n}$ stands for the normal vector leaving the Gaussian surface. In a discretized form, the outward flux from right, left, top and bottom sides of surface C is:

$$\begin{cases} \psi_r = \varepsilon_1 \frac{\phi_1 - \phi_0}{h} \frac{h}{2} + \varepsilon_3 \frac{\phi_3 - \phi_0}{h} \frac{h}{2} \\ \psi_l = \varepsilon_0 \frac{\phi_1 - \phi_0}{h} \frac{h}{2} + \varepsilon_2 \frac{\phi_1 - \phi_0}{h} \frac{h}{2} \\ \psi_t = \varepsilon_2 \frac{\phi_2 - \phi_0}{h} \frac{h}{2} + \varepsilon_3 \frac{\phi_2 - \phi_0}{h} \frac{h}{2} \\ \psi_b = \varepsilon_0 \frac{\phi_4 - \phi_0}{h} \frac{h}{2} + \varepsilon_1 \frac{\phi_4 - \phi_0}{h} \frac{h}{2} \end{cases} \quad (1.27)$$

The total flux leaving the Gaussian surface C is zero, so:

$$\psi_r + \psi_r + \psi_r + \psi_r = 0 \quad (1.28)$$

$$\Rightarrow \frac{\varepsilon_1 + \varepsilon_3}{2}(\phi_3 - \phi_0) + \frac{\varepsilon_0 + \varepsilon_2}{2}(\phi_1 - \phi_0) +$$

$$\frac{\varepsilon_2 + \varepsilon_3}{2}(\phi_2 - \phi_0) + \frac{\varepsilon_0 + \varepsilon_1}{2}(\phi_4 - \phi_0) = 0$$

$$\Rightarrow (\varepsilon_1 + \varepsilon_2 + \varepsilon_3 + \varepsilon_4)\phi_0 = \frac{1}{2}[(\varepsilon_0 + \varepsilon_2)\phi_1 +$$

$$(\varepsilon_0 + \varepsilon_2)\phi_3 + (\varepsilon_0 + \varepsilon_2)\phi_4]$$

Nodes $\varphi 1$, $\varphi 2$, $\varphi 3$, $\varphi 4$, can be either inner or boundary nodes.

Using the method described above, an equation is created for each inner point of the FDM grid. The resulting linear system of equations has the following form:

$$E \cdot \Phi = B \Rightarrow \begin{bmatrix} E_{11} & E_{12} & \cdots & E_{1n} \\ E_{21} & E_{22} & \cdots & E_{2n} \\ \vdots & \vdots & \ddots & \vdots \\ E_{m1} & E_{m2} & \cdots & E_{mn} \end{bmatrix} \begin{bmatrix} \phi_1 \\ \phi_2 \\ \vdots \\ \phi_n \end{bmatrix} = \begin{bmatrix} b_1 \\ b_2 \\ \vdots \\ b_m \end{bmatrix} \quad (1.29)$$

where m is the number of boundary points, n is the number of inner points, E is a m×n coefficient matrix, $\Phi$ is the vector of the n unknown inner point potentials and B is a vector containing the potentials of the m boundary nodes.

If $\phi_c$ is the potential at the center point of the grid, the discretized Green's function can be defined as the value of $\phi_c$ for all possible excitation points on the boundary of the domain. This is equivalent to solving the linear system described by Eq. (1.29) for border vectors:

$$B = \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \quad (1.30)$$

Figure 13:
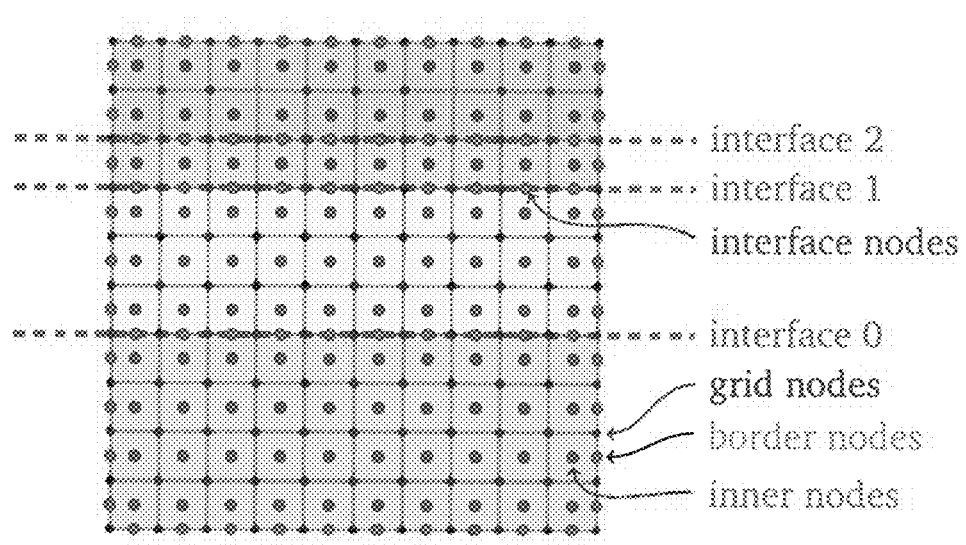
FIG. 13 shows, further to FIGS. 10-12, inner nodes being placed at the centers of the grid cells with additional points being added on each interface and border nodes being placed in the middle of the corresponding boundary segments in accord with at least some aspects of the present concepts.

A discretization is applied to the transition domains as shown in FIG. 13. The internal and boundary nodes are not coincident with the grid points and additional "ghost" nodes are inserted on dielectric interfaces (interface nodes). By convention, dielectric interfaces are aligned with the grid. This discretization scheme has the advantages that corner nodes of the domain, which will have zero selection probability, are not calculated at all and that the transition to a 3D solver is more straightforward.

The Green's function is specified by solving the following system:

$$\begin{bmatrix} E_{11} & E_{11} & E_{11} \\ 0 & I_2 & 0 \\ E_{31} & 0 & D_{33} \end{bmatrix} \begin{bmatrix} \Phi_I \\ \Phi_B \\ \Phi_F \end{bmatrix} = \begin{bmatrix} 0 \\ f_B \\ 0 \end{bmatrix}$$

Where $N_G$ is the number of grid points per edge and $N_D$ is the number of different dielectric layers in the domain (assuming there are only planar dielectrics), then:

$$\begin{array}{ll} \text{inner points count} & N_I = (N_G - 1)^2 \\ \text{interface points count} & N_F = (N_D - 1) * (N_G - 1) \\ \text{boundary points count} & N_B = 4 * (N_G - 1) \end{array} \quad (1.31)$$

and the dimensions of the matrices in Eq. (1.31) shall be:

$$\begin{array}{l|l|l|l|l|l|l} \Phi_I & N_I \times 1 & E_{11} & N_I \times N_I & E_{31} & N_F \times N_I \\ \Phi_B & N_B \times 1 & E_{12} & N_I \times N_B & D_{33} & N_F \times N_F \\ \Phi_F & N_F \times 1 & E_{13} & N_I \times N_F & & \end{array}$$

Figure 14:
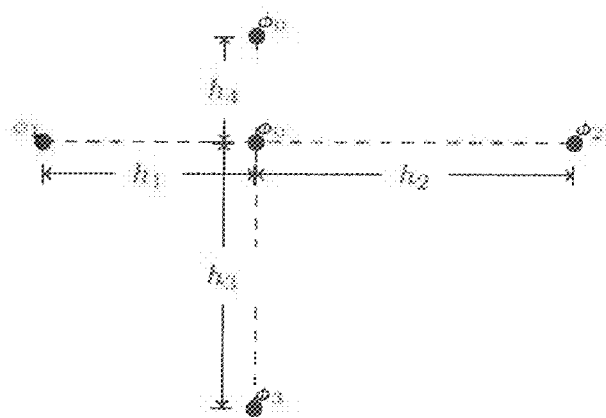
FIG. 14 shows a generic FDM stencil in accord with at least some aspects of the present concepts wherein $\varphi_1$, $\varphi_2$, $\varphi_3$, $\varphi_4$ can be inner, interface or boundary nodes.

Matrices $E_{11}$, $E_{12}$, $E_{13}$ are derived from Eq. (1.24) using the FDM. The following equations describe a generic solution for the five-point FDM stencil, illustrated in FIG. 14, with arbitrary distances between the stencil points:

$$\phi_0 = \frac{\phi_1}{\left(1 + \frac{h_1}{h_2}\right)\left(1 + \frac{h_1 h_2}{h_3 h_4}\right)} + \frac{\phi_2}{\left(1 + \frac{h_2}{h_1}\right)\left(1 + \frac{h_2 h_1}{h_3 h_4}\right)} + \quad (1.32)$$

$$\frac{\phi_3}{\left(1 + \frac{h_3}{h_4}\right)\left(1 + \frac{h_3 h_4}{h_1 h_2}\right)} + \frac{\phi_4}{\left(1 + \frac{h_4}{h_3}\right)\left(1 + \frac{h_1 h_3}{h_1 h_2}\right)}$$

Matrices $E_{11}$, $E_{12}$, $E_{13}$ are derived from Eq. (1.24) using the FDM. The following equations describe a generic solution for the five-point FDM stencil, illustrated in FIG. 14, with arbitrary distances between the stencil points:

In order to populate $E_{11}$, $E_{12}$, $E_{13}$ matrices, the inner points are iterated through and the coefficients calculate for the nodes around them according to Eq. (1.32). The coefficients for inner nodes are stored in $E_{11}$, for boundary nodes in $E_{12}$ and for interface nodes in $E_{13}$.

Figure 15:
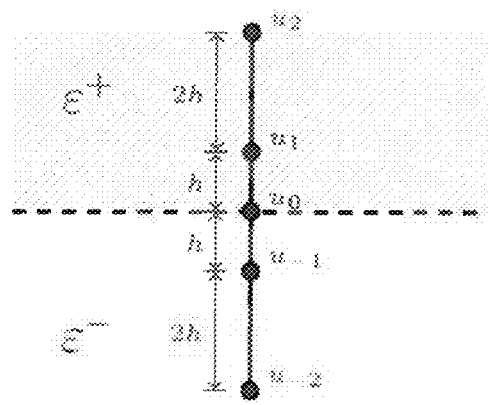
FIG. 15 shows points around a dielectric interface in accord with at least some aspects of the present concepts where $u_0$ is an interface point, $u_1$ and $u_{-1}$ are inner points and $u_2$, $u_{-2}$ can be either inner or boundary nodes.

Matrices $E_{31}$ and $D_{33}$ are derived from Eq. (1.25). Points around a dielectric interface are illustrated in FIG. 15. Based on Eq. (1.25), the left and right side derivatives can be expanded using Lagrange interpolation:

$$\varepsilon^+ \frac{-8u_0 + 9u_1 - u2}{6h} = \varepsilon^- \frac{-8u_0 + 9u_{-1} - u2}{6h} \quad (1.33)$$

$$\Rightarrow \underbrace{-8(\varepsilon^- + \varepsilon^+)}_{D_{aa}} u_0 + \underbrace{9\varepsilon^+}_{E_{31}} u_1 \underbrace{-\varepsilon^+}_{E_{31}} u_2 + \underbrace{9\varepsilon^-}_{E_{31}} u_{-1} \underbrace{-\varepsilon^-}_{E_{31}} u_{-2} = 0$$

In a manner similar with the equations used in the first method, the discretized Greens' function values are:

$$P_c = -((E_{11} - E_{13}D_{33}^{-1}E_{31})^{-T} e_c)^T E_{12} \quad (1.34)$$

As mentioned above, the results produced by this second method are exactly the same with those from the first method. The second method is a more complex, but the more convenient positions of the boundary nodes make this method preferable, at least at the present time.

Using the same method that was used for the calculation of the discretized Green's function, the Green's gradient function is calculated:

$$\begin{cases} \frac{\partial P_c}{\partial x} = -\left((E_{11} - E_{13}D_{33}^{-1}E_{31})^{-T} \hat{e}_x\right)^T E_{12} \\ \frac{\partial P_c}{\partial y} = -\left((E_{11} - E_{13}D_{33}^{-1}E_{31})^{-T} \hat{e}_y\right)^T E_{12} \end{cases} \quad (1.35)$$

where $\hat{e}_x$ and $\hat{e}_y$ mark the coefficients of the potentials at the points around the center of the transition domain that must be used to calculate the gradient using central differences.

Figure 16:
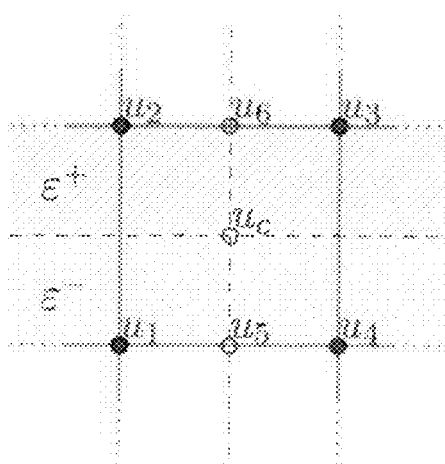
FIG. 16 shows a stencil for the calculation of the potential at the center of the domain, when there is no inner point in accord with at least some aspects of the present concepts.
Figure 17:
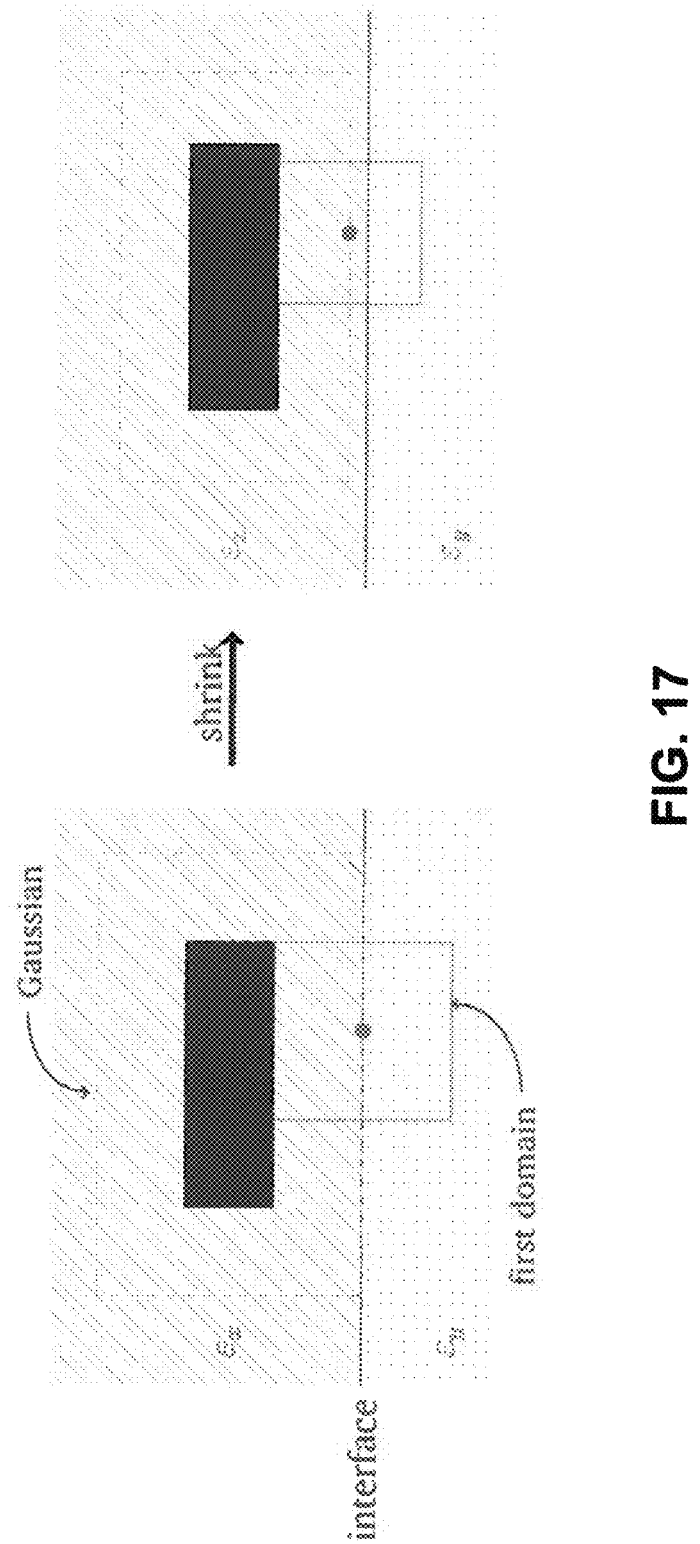
FIG. 17 shows a forced shrinking of the Gaussian surface in accord with at least some aspects of the present concepts when the middle of the first domain is at the same height with a dielectric interface.
Figure 18:
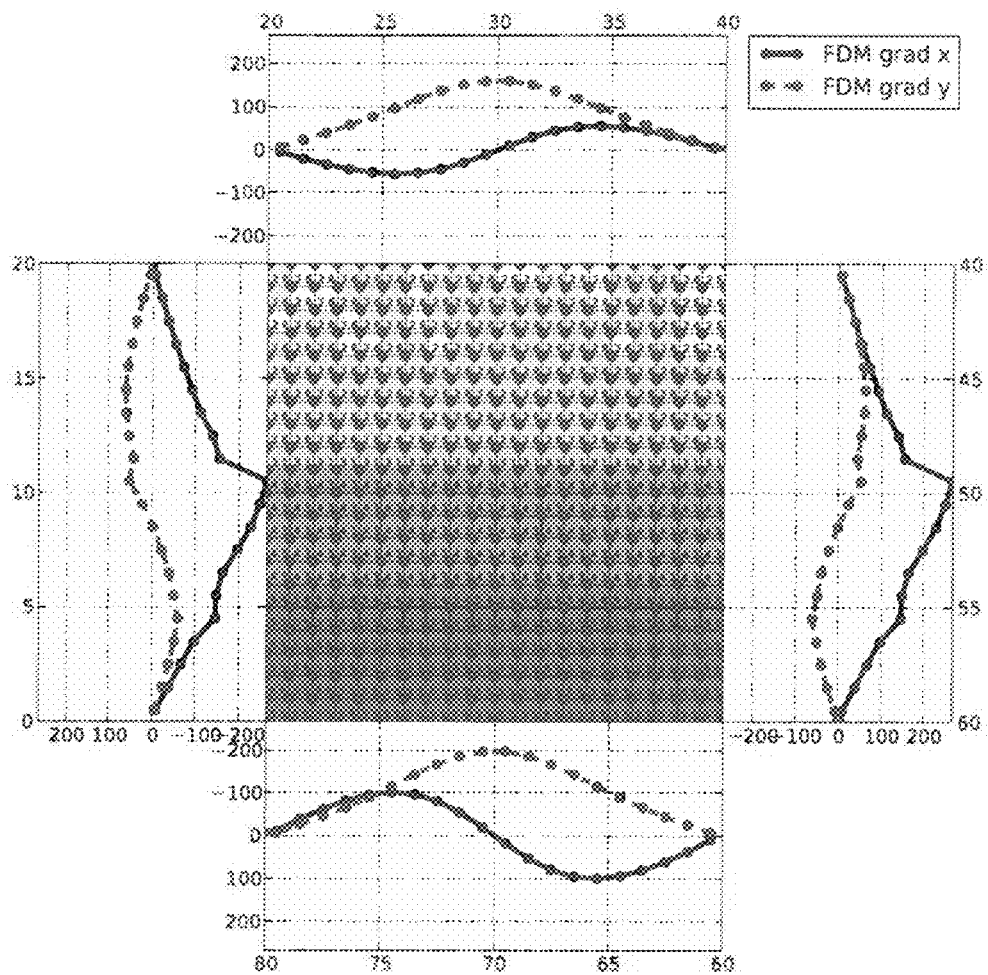
FIG. 18 shows a 2-D Green's gradient for a multilayer dielectric domain, using a 21×21 FDM grid, in accord with at least some aspects of the present concepts.

In cases where the number of FDM points per edge is an odd number, there is no inner node coincident with the center of the domain. For these cases, the potential at the center point is approximated by its four closest neighbors. For the stencil illustrated in FIG. 16, the potential at the center (ghost) point $u_c$ can be calculated using the ghost points $u_6$ and $u_5$:

$$u_c = \frac{\varepsilon^+ u_6 + \varepsilon^- u_5}{\varepsilon^+ + \varepsilon^-} \quad (1.36)$$

$$= \frac{\varepsilon^+ (u_6 + u_3) + \varepsilon^- (u_1 + u_4)}{2(\varepsilon^+ + \varepsilon^-)}$$

With this method, $e_c$ in Eq. (1.34) can be modified by adding the coefficients of the points around the center ($u_1$, $u_2$, $u_3$, $u_4$). A similar method is used for the approximation of the Green's gradient function value at the center of such domains.

Regardless of the dielectric configuration, the continuity of the Green's function is guaranteed. This does not hold for its differentiability. More specifically, the Green's gradient (the y-axis component) cannot be defined in cases where a dielectric interface is coincident to the center of the transition domain. To avoid such cases, the Gaussian surface creation method was modified to guarantee that the first transition domain does not have a dielectric interface on its middle. To do so, the Gaussian surface is shrunk so that the distance to the enclosed site is at least the height of one FDM cell far from the closest dielectric interface.

During the lifetime of a complete FRW-based extraction, millions of transition domains are generated. Characterizing these domains, one at a time, with the FDM solvers described in the previous sections, is impractical. By way of example, the present inventors tested extracting an experiment without any pre-computation at all for accuracy evaluation purposes. The original FRW algorithm with 200,000 walks took 5 days and 21 hours on a single processor. Therefore, in accord with at least some aspects of the present concepts, it is necessary to implement a mechanism able to pre-characterize a set of domains and match the actual domains generated by the FRW procedure with the ones already characterized. The first part of this mechanism will be called "pre-computation" and the second "matching" hereafter.

Conventional FRW processes skip the problem of characterizing multiple dielectric domains by limiting the size of the transition domains so that they contain only one dielectric. While simple, the resulting generation of much smaller and much more transition domains affects both the accuracy and the speed of the algorithm. Performance degradation is caused by the fact that more steps are needed for each walk, while accuracy penalty is introduced by the fact that the size of the first transition domain launched from the Gaussian surface is constrained by neighboring dielectric interfaces. Smaller first domains result in poorer estimators of the charge on the surface of the conductor and thus slower convergence of the stochastic procedure. Having domains with up to two dielectrics is supported, based on the questionable observation that capacitance coupling mainly exists between neighbor metal layers and that between these metal layers, at most two dielectric layers are enclosed. However, the present inventor's experiments with modern PDKs contradict this questionable observation. Two more aspects of the methodology used should be noted: 1) for consecutive dielectric pairs in the stack-up, a set of unit-size domains is pre-characterized by moving the dielectric interface between the two layers and scaling is used to match actual domains; 2) during the matching procedure a shrinking mechanism is employed in order to guarantee a perfect match with the dielectric interface position of the most similar domain in the pre-computed set.

In order to efficiently handle large designs in modern CMOS technologies, handling of transition domains enclosing any number of dielectrics is important and, in accord with the present concepts, the concept of multi-tier domain pre-characterization and matching are disclosed and, in using this method, all related constraints in the transition domain creation procedure are realized.

Figure 19:
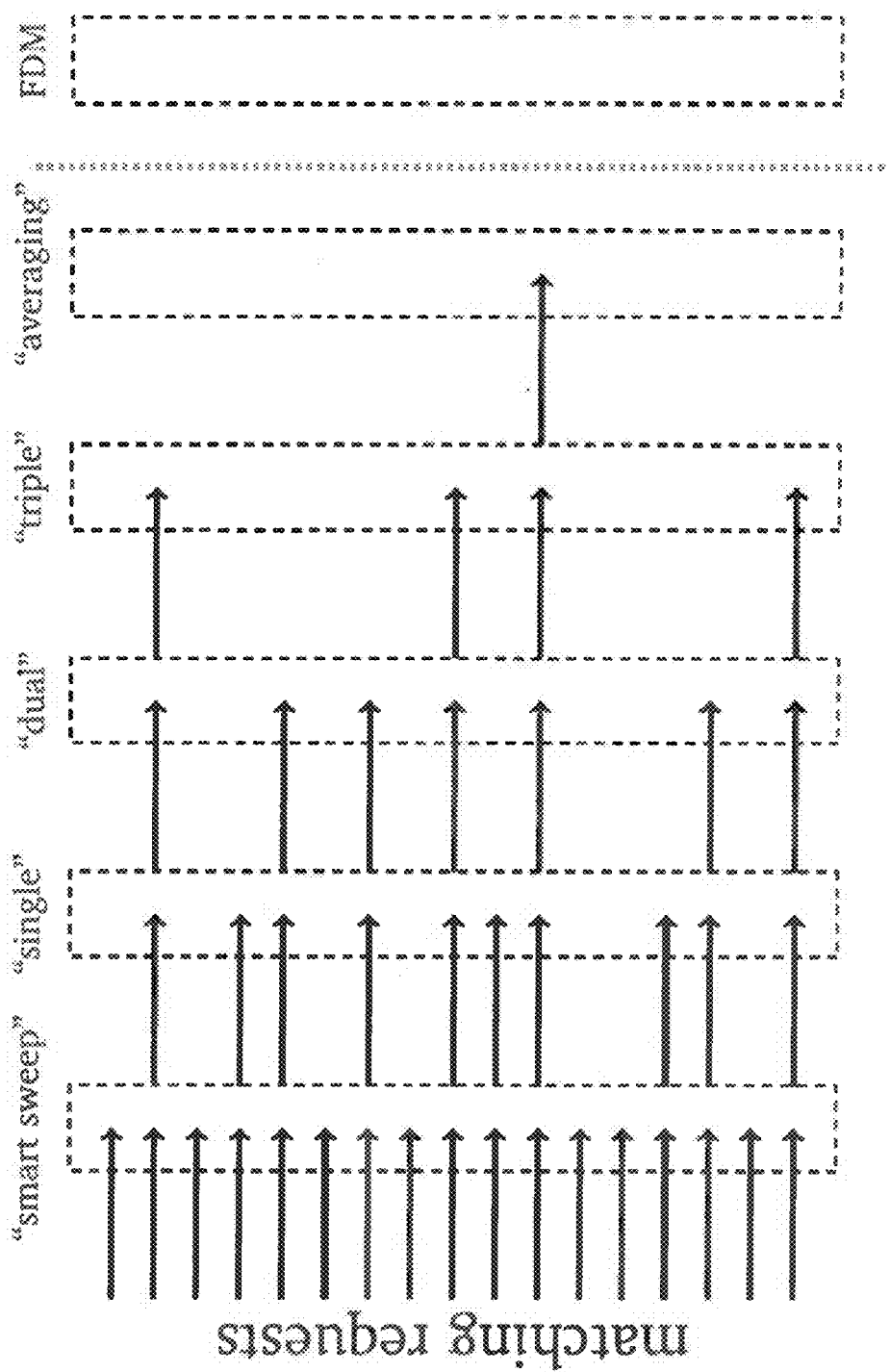
FIG. 19 shows an illustration of multi-tier matching in accord with at least some aspects of the present concepts.

The goal of the methodologies described herein is to match any domain, requested by the FRW procedure, with the most accurate pre-characterized domain. The process of selecting how many and which domains should be pre-characterized introduces trade-offs between accuracy, efficiency and memory footprint. Statistical analysis of the characteristics of the matching requests occurring during FRW runs in real-world test cases, helps to compromise these trade-offs and adjust the participation of each of the tiers in the matching process. The rationale behind the disclosed multi-tier approach is that there cannot be a single approach adequate for all possible domain matching requests. On the other hand, there are matching methods of variable accuracy guarantees. The presently disclosed concepts seek to use the best use cases for each of the available methods. FIG. 19 illustrates an example of the process of serving a matching request, with each tier acting like a filter as to successive operations.

In at least one aspect of the present concepts, depicted in FIG. 19, five pre-computation methods are used: "smart sweep" (SWP—Tier 1), "single dielectric" (SID—Tier 2), "two-dielectric" (TWD—Tier 3), "three dielectric" (THD—

Tier 4) and "averaging" (AVG—Tier 5), each of which are discussed below. Should any of these tiers fail to provide a pre-characterized solution, a Finite Differences Method (FDM—Tier 6) is employed.

From the discussed methods, single, dual, triple dielectric and AVG use unit-size domains during pre-characterization and scaling to match the requested geometry, whereas the SWP method pre-characterizes domains of arbitrary dimensions based on the metal stack. Also, the AVG method, unlike the others, is Process Design Kit (PDK) independent. All pre-characterization methods use the same FDM solver and their accuracy is affected by the detail of the FDM grid used.

Of these methods, the least accurate method is AVG and, as such, it is the method used with the lowest priority (see FIG. 19). Although the AVG method is considered to be less accurate than the other methods, based on the inventors' evaluation of possible pre-computation schemes and experiments using solely the AVG method, it was determined to produce acceptable results for many test cases.

With regard to the single-dielectric domains (SID) of FIG. 19 (i.e., "single"), in accord with at least some aspects of the present concepts, the process of pre-computing and matching is relatively easy for uniform dielectric domains. In that case, pre-characterizing a unit size domain suffices for matching any one-dielectric domain of any size and any dielectric permittivity.

For the implemented prototype, for simplicity and consistency reasons, the present inventors pre-characterize unit-size domains for all the dielectrics of the stack and only scale the pre-characterized domain to match it with the requested domains. This way, a domain is pre-characterized for each dielectric layer in the PDK.

Figure 20:
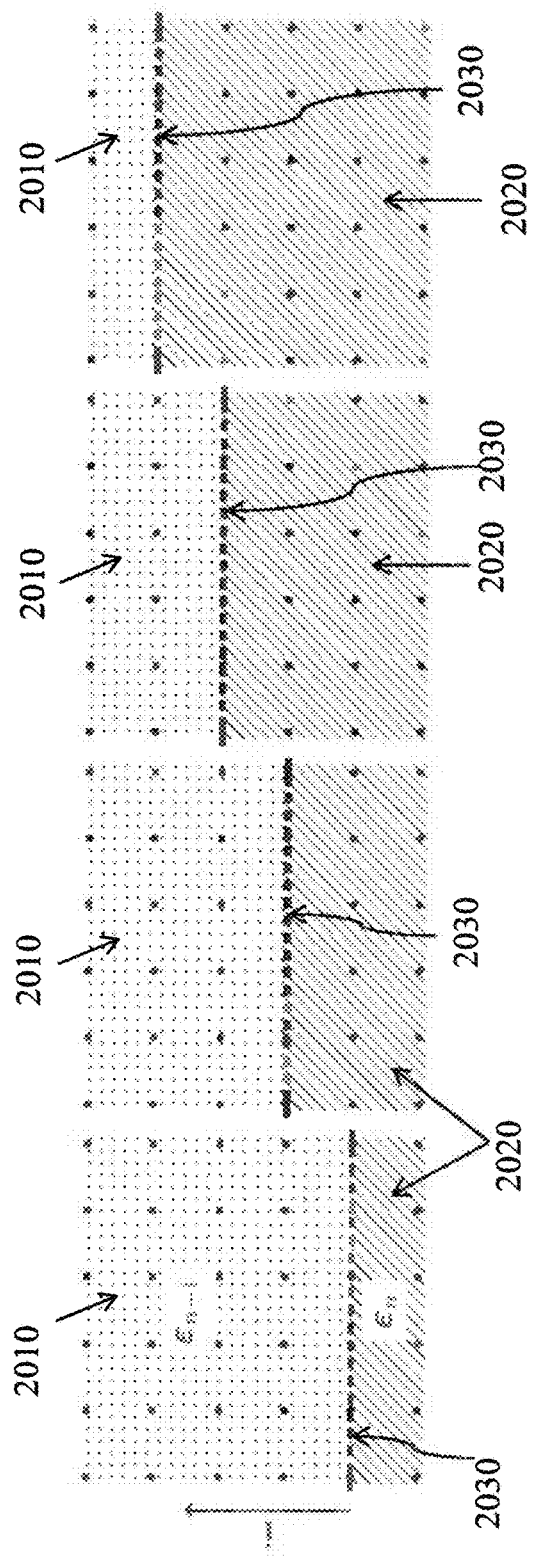
FIG. 20 shows pre-computed combinations for a domain with two dielectrics discretized with a 6×6 grid, in accord with at least some aspects of the present concepts, wherein the dielectric interface is moved to all possible heights in the FDM grid to produce the pre-computed combinations.
Figure 21:
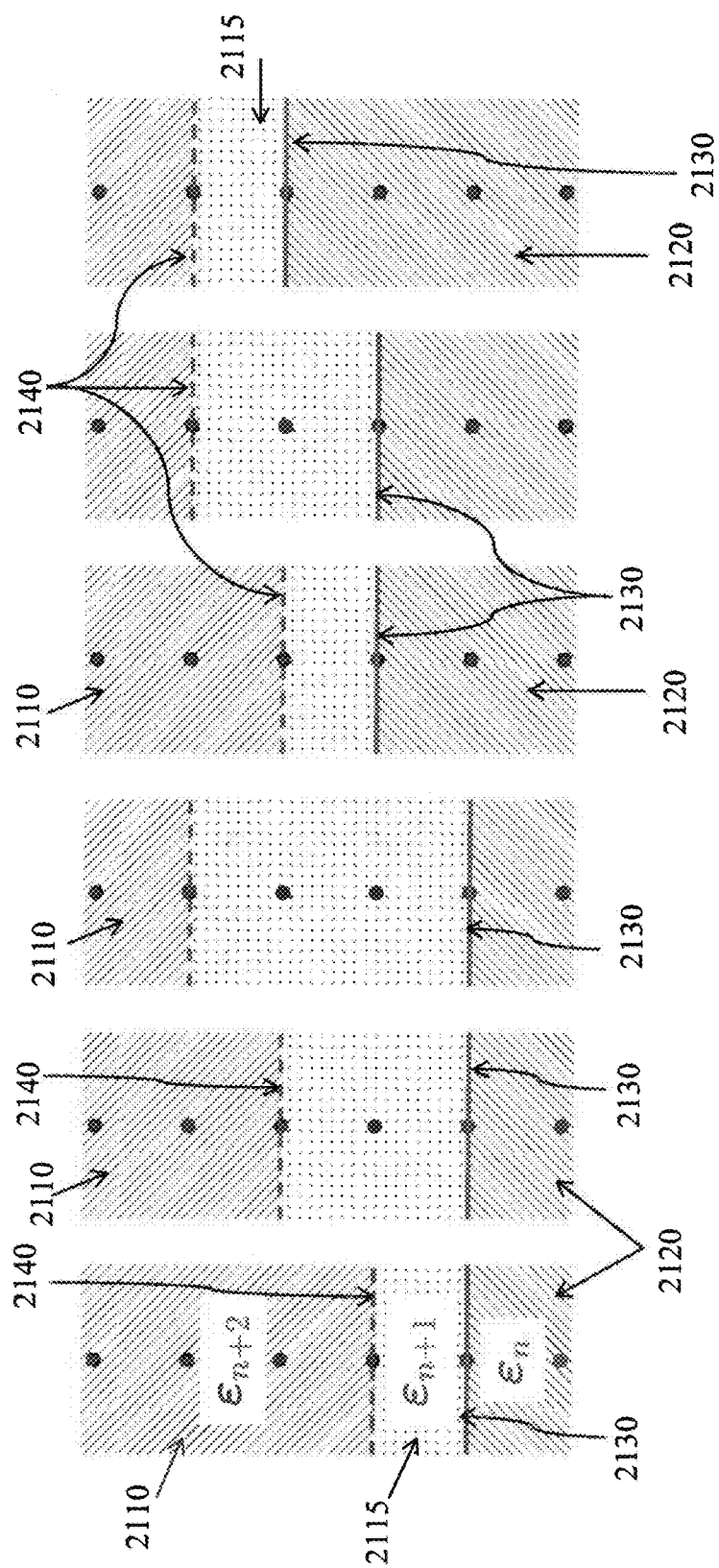
FIG. 21 shows pre-computed combinations for transition domains with three dielectrics discretized with a 6×6 grid, in accord with at least some aspects of the present concepts, wherein the dielectric interfaces are moved to all possible heights in the FDM grid to produce the pre-computed combinations.

With regard to the two-dielectric domains (TWD) of FIG. 19 (i.e., "dual"), in accord with at least some aspects of the present concepts, the pre-characterized set of combinations for two-layer dielectric domains can be determined as shown in FIG. 20, which depict a first dielectric 2010 and second dielectric 2020 having permittivities $\varepsilon_n$ and $\varepsilon_{n+1}$, respectively, represented by different cross-hatching. Specifically, FIG. 21 shows four different pre-computed combinations for a domain with two dielectrics discretized with a 6×6 grid, in accord with at least some aspects of the present concepts, wherein the dielectric interface 2030 is moved to all possible heights in the FDM grid to produce the pre-computed combinations. Although four different pre-computed combinations are illustrated, by way of example, for a domain with two dielectrics discretized with a 6×6 grid, the present concepts can similarly be applied to other domains having two dielectrics.

If $N_G$ is the number of FDM grid points per edge and $N_D$ is the number of dielectrics in the specific PDK stack, then the amount of combinations required is:

$$N_{TWD} = (N_D - 1)(N_G - 2) \qquad (1.37)$$

In order to match domains with two dielectrics, the position of the dielectric interface in the FDM grid needs to be specified. This process introduces error that depends on the density of the FDM grid.

Turning then to three-dielectric domains (TWD) of FIG. 19 (i.e., "triple"), in accord with at least some aspects of the present concepts, the method used for creating the combinations for the pre-characterization of all the possible domains that contain three consecutive dielectric layers is similar with the one presented above with respect to the example of the two-layer dielectric domain. FIG. 21 shows a first permittivity ($\varepsilon_n$), second permittivity ($\varepsilon_{n+1}$) and third permittivity ($\varepsilon_{n+2}$), respectively, represented by different cross-hatching. FIG. 21 more particularly shows all of the available combinations of three dielectrics in a 6×1 FDM grid and, more specifically, shows pre-computed combinations for transition domains with three dielectrics discretized with a 6×1 grid wherein the dielectric interfaces are moved to all possible heights in the FDM grid to produce the pre-computed combinations.

The amount of dielectric combinations that should be pre-characterized for a stack of $N_D$ dielectrics and a $N_G \times N_G$ FDM solver is:

$$N_{THD} = (N_D - 2) \sum_{k=1}^{N_G - 3} k = \frac{1}{2}(N_D - 2)(N_G - 3)(N_G - 2) \qquad (1.38)$$

In a similar manner as the method described above for two-dielectric domains, the dielectric interfaces are specified with respect to the FDM grid, in order to serve the matching requests. Combination lookup in the pre-computed data set is done in constant time.

Figure 22:
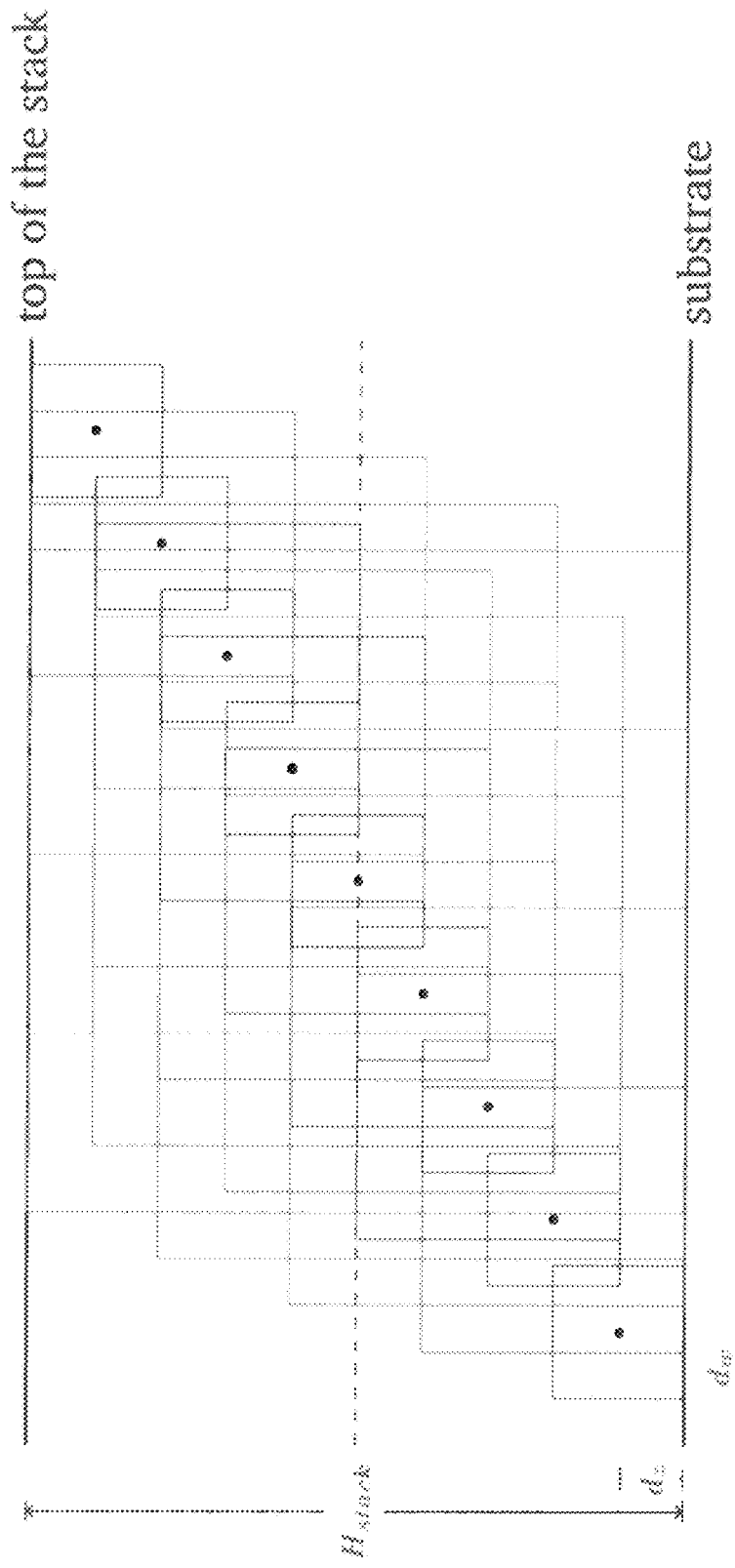
FIG. 22 shows an example of domains required for full stack sweep.

As to the "smart sweep" method (SWP) of FIG. 19 and FIG. 22, in accord with at least some aspects of the present concepts, owing to the usage of dozens of dielectric layers in modern CMOS technologies, it is critical to accurately pre-characterize and match domains with any number of enclosed dielectrics. As discussed above, limiting the sizes of the generated domains can drastically degrade the performance of and the accuracy of the FRW process. To accurately pre-characterize and match domains with any number of enclosed dielectrics, knowledge of the specific technology (PDK) used should be fully leveraged. Pre-characterizing domains in their physical size in the stack is one non-limiting option. However, doing so for all possible positions and all possible sizes would require impractical amounts of processing and memory usage.

Looking at the combinations space, all possible transition domains for a stack with height $H_{stack}$, could be generated by moving along the z axis with a step $d_z$ and at each point create domains with all the possible dimensions, i.e. all the possible widths with a $d_w$ step, as illustrated in FIG. 22, which shows domains required for a full stack sweep from the substrate to the top of the stack.

Due to symmetry reasons, if the stack is divided horizontally, the amount of height/width combinations required for the bottom part is equal to the amount of combinations required for the upper part. If $N_h$ is the number of distinct height values used ($N_h = H_{stack}/d_z$), then the total amount of domains that need to be pre-characterized to cover the full stack will be:

$$N_{full-sweep} = 2 \sum_{k=1}^{N_h/2} \frac{h_k}{d_w} = 2 \sum_{k=1}^{N_h/2} k \frac{d_z}{d_w} = 2 \frac{d_z}{d_w} \sum_{k=1}^{N_h/2} k = \frac{1}{2} \frac{d_z}{d_w} \left( \frac{N_h^2}{2} + 1 \right) \qquad (1.39)$$

Figure 23:
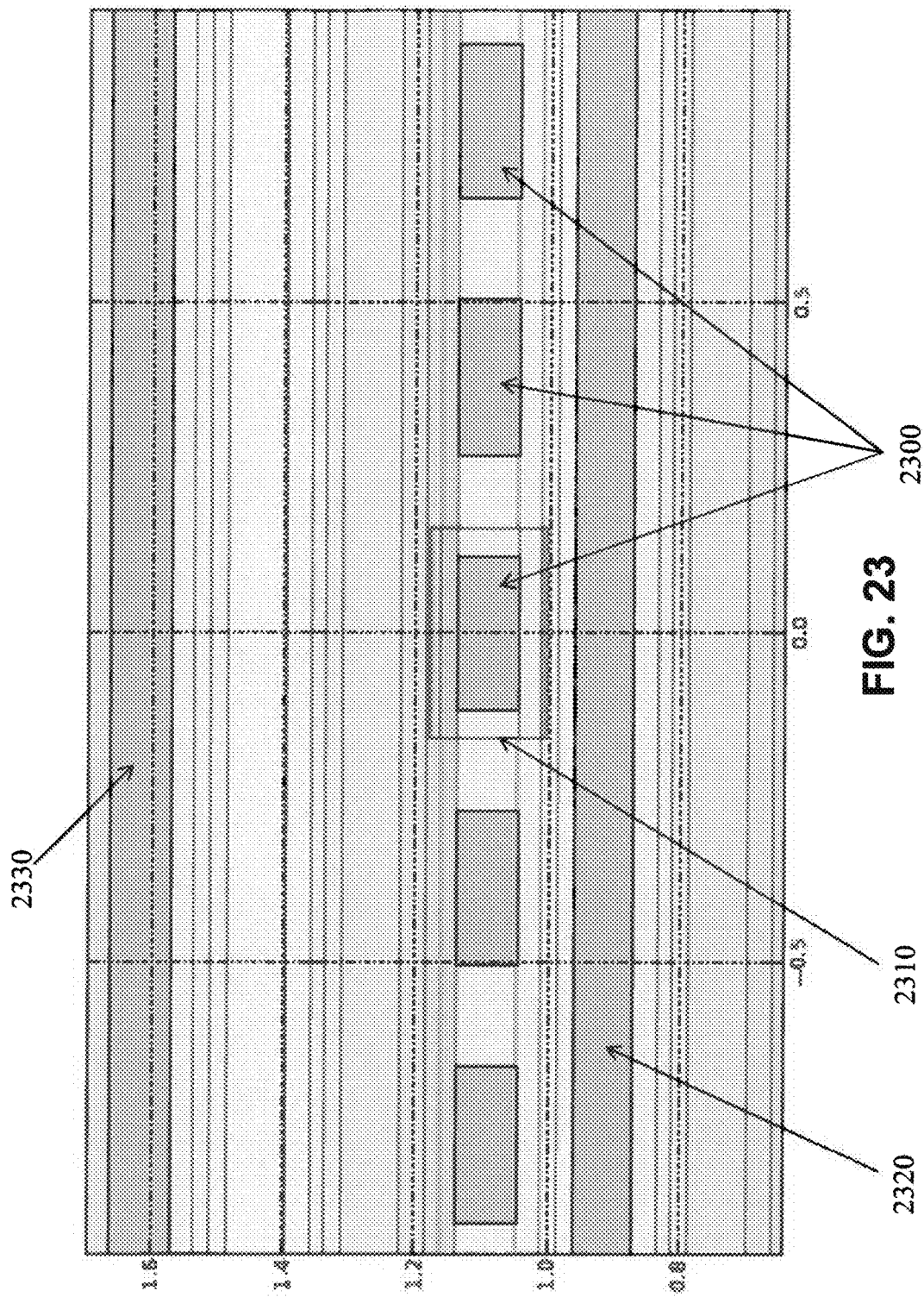
FIG. 23 shows an experiment conducted in accord with at least some aspects of the present concepts.

An experiment, aspects of which are depicted in FIG. 23, wherein the metal layers M8-M5-M4 are shown, a width is 0.2343 um and spacing is 0.1527 um. Walks are launched from the conductor 2300 in the middle of FIG. 23. A total number of 28056 walks were launched.

The requested domains can be categorized by the five pre-computation methods (SID, TWD, THD SWP and AVG).

The matching frequencies are shown in Table 1.1 below.

TABLE 1.1

| Method | Green's | Green's gradient |
|---|---|---|
| SID | 10651 | 287 |
| TWD | 5671 | 2318 |
| THD | 5071 | 1832 |
| SWP | 52859 | 20238 |
| AVG | 8295 | 3381 |

Matching input requests is more complicated and time consuming for the SWP method than for the methods previously presented. The problem of specifying the data point closest to the request is essentially a nearest neighbor search problem (NN). The expected complexity of the queries is O(log n).

Following a totally different approach, the AVG method is PDK-agnostic and aims to approximately match input requests with one of the precomputed dielectric combinations.

Let $\varepsilon_{min}$, $\varepsilon_{max}$ be the minimum and maximum allowed dielectric permittivity values. If we discretize the interval $[\varepsilon_{min}, \varepsilon_{max}]$ with a step $\varepsilon_{step}$, a set D of dielectric permittivity values is created with:

$$N_d = \frac{[\varepsilon_{min} - \varepsilon_{max}]}{\varepsilon_{step}}$$

members.

Figure 24:
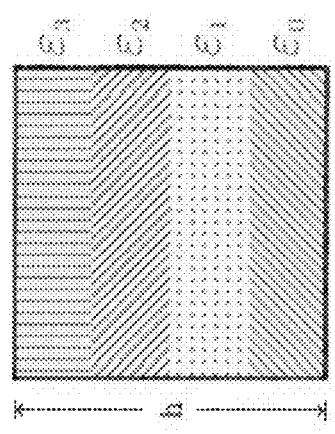
FIG. 24 shows a precomputation pattern for the AVG method in accord with at least some aspects of the present concepts.

The pre-computed unit-size domains have $N_{slices}$ number of slices of equal height. Each slice can have any dielectric from D. In FIG. 24, a pattern with four slices is illustrated by way of example. The number of permutations, with replacement, of length $N_{slices}$ of D is the number of domains that must be pre-characterized:

$$N_{AVG} = N_d^{N_{slices}} \quad (1.40)$$

Figure 25:
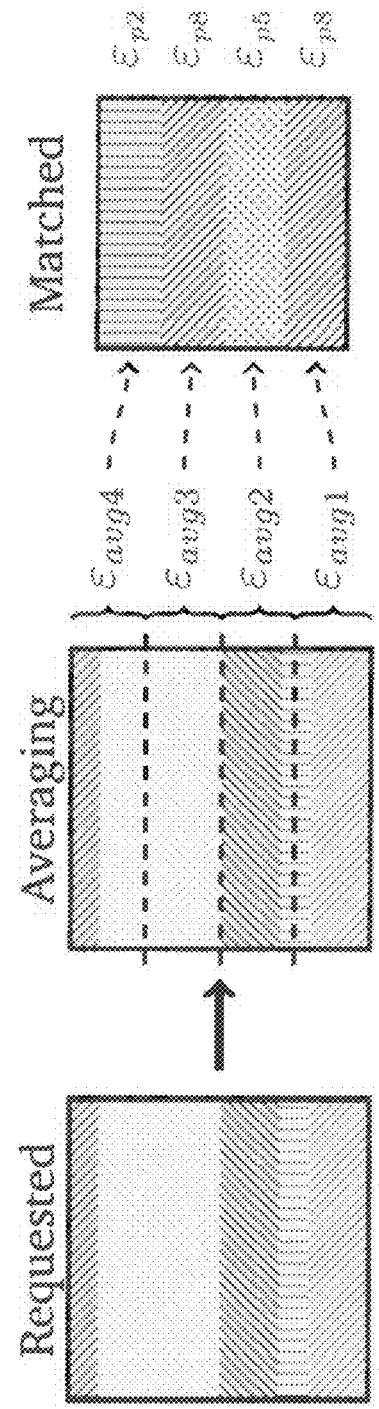
FIG. 25 shows an AVG matching example in accord with at least some aspects of the present concepts wherein $\varepsilon_{avgX}$ values are the calculated average values for each slice, while $\varepsilon_{pX}$ are permittivity values from the precomputed set D.

The matching process for the AVG method involves the following steps, which are represented in FIG. 25:

1. Divide the input domain in $N_{slices}$ vertical slices of equal height;
2. Calculate a weighted average permittivity value for each slice i
3. Find the value in D that is closest to $\varepsilon_{eq}^{(i)}$ for each slice i.
4. Create a combination of dielectric permittivity values with the matched values from the previous step and find the combination in the pre-computed data set. Searching for a combination is done in constant time using hash tables.
5. Scale the results for the unit-size domain to match the dimensions of the requested one.

As discussed above, all the described methods (i.e., SID, TWD, THD, SWP and AVG) may be combined into a common scheme (see, e.g., FIG. 19) in which the SWP is the first method implemented in order to serve a request. The matching frequencies (Table 1.1) show it is more probable that a domain request belongs to that method than any other method. Even if a domain contains only two or three dielectrics, the SWP method is preferred over TWD or THD because it solves a more accurate discretization of the domain—the snapping of the dielectric interfaces to the closest FDM grid row is avoided. It is to be noted, however, that the present concepts include different combinations of any of the above-described methods (i.e., any combination of SID, TWD, THD, SWP and/or AVG), arranged in any order.

Although matching frequencies for AVG are not the smallest, this method is the least preferred because of its inherent inaccuracies.

The impact on accuracy of the proposed multi-tier scheme, compared to the much simpler and PDK agnostic AVG scheme is demonstrated by extracting total capacitance of a large number of structures similar to those depicted in FIG. 23. In particular, 31687 experiments consisting of various combinations of conductor layers (2300, 2320, 2330) were used in order to extract the total capacitance of the center conductor 2300. Reference data were available by the process manufacturer and error percentages were calculated for the entire population. Table 1.2 presents mean and standard deviation of all errors for the multi-tier pre-characterization scheme against and AVG only scheme. The matching frequencies shown in Table 1.1 clearly show that a SWP tier that handles the majority of the transition domain requests offers significant accuracy improvements over a very large number of experiments.

TABLE 1.2

| Method | Mean (%) | Standard Deviation (%) |
|---|---|---|
| Multi-tier | 0.69 | 2.75 |
| AVG only | 1.28 | 3.71 |

The experiments were conducted on Hewlett Packard Blade ProLiant machine with two Intel Xeon CPU E5-2630 processors and 384 GB of DDR-4 memory. The computer was also equipped with two 6G-SAS (Serial Attached SCSI) 300 GB drives and one two-port 20 Gb FlexFabric network controller.

The aforementioned acts are executed on a computer system particularly configured to perform the noted capacitance extraction functions described above. As noted, numerical characterization of Green's functions in a floating random walk algorithm is an important part of the capacitance extraction when multiple layers of 3-D interconnects are embedded in a multi-dielectric VLSI structure (e.g., a full-chip extraction) and in which Green's functions are needed for each of the million(s) of transition domains generated by the floating random walk algorithm, whereby it is impractical to compute them on demand. In accord with the present concepts, a pre-characterization mechanism is provided to yield a smaller and manageable number of domains along with an algorithm to match them with actual domains generated during run-time by the floating random walk method, providing improved efficiency in terms of memory footprint and accuracy.

The computer system includes a data storage system connected to one or more computers communicatively coupled (e.g., hard-wired connection, fiber optic connection, wireless connection, Ethernet connection, etc.) to the data storage system, such as via a bus, network connection, Internet and/or intranet, or other network connection by which the one or more computers may access and communicate with the data storage system and, optionally, with other computers in a computer system comprising a plurality of computers. The processors utilized by the computer(s) may comprise a variety of commercially available single or multi-processor systems such as, but not limited to, Intel-based processors.

Each computer, as well as the data storage system, may all be located at the same physical site, or, alternatively, may also be located in different physical locations. Examples of the communication medium that may be used to provide the different types of connections between the host computer systems, the data manager system, and the data storage system of the computer system may use a variety of different conventional communication protocols.

The data storage system generally includes a physical, non-transient computer-readable media to which data, inclusive of instructions, can be stored and retrieved by the processor(s). The data storage system may comprise, for example, a magnetic disk, optical disk, or solid-state memory devices.

The computer system is coupled (e.g., via bus) to one or more I/O devices, such as a display, graphical user interface (GUI), touchpad, keyboard, keypad, mouse, joystick, trackball, or the like.

The invention is related to the use of computer system for performing the floating random walk capacitance extraction, such as by using the processor(s) to execute sequences of instructions contained in a main computer memory to determine the structure capacitance. In such ordered combination in accord with the present concepts, over a very large number of calculations, accuracy is improved over conventional computer-implemented methods and systems for capacitance extraction. This improved accuracy advances circuit design, particularly in view of shrinking process technologies.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A circuit design method comprising:
   performing multi-tier domain pre-characterization for floating random walk capacitance extraction of a semiconductor structure comprising one or more dielectric layers by:
      generating a plurality of pre-characterized floating random walk domains;
      obtaining a Green's function of each of the pre-characterized floating random walk domains;
      storing the Green's function of each of the pre-characterized floating random walk domains in a database; and
      performing a floating random walk procedure using the domains stored in the database, said performing including matching at least one domain during a floating random walk to one of the plurality of pre-characterized domains, said matching including determining which of a smart sweep method, a single dielectric method, a two-dielectric method, a three-dielectric method or an averaging method is most suitable and applying the most suitable method; and
   extracting and verifying a layout of a circuit using the pre-characterized floating random walk domains in the database.

2. The method of claim 1, wherein the plurality of pre-characterized floating random walk domains comprise five tiers according to a number and order of dielectric layers within each domain.

3. The method of claim 2, wherein one tier of pre-characterized floating random walk domains comprises domains with all combinations of all consecutive dielectric layers of the semiconductor structure.

4. The method of claim 2, wherein one tier of pre-characterized floating random walk domains comprises domains with each of the dielectric layers of the semiconductor structure.

5. The method of claim 2, wherein one tier of pre-characterized floating random walk domains comprises domains with two dielectric layers of the semiconductor structure in which a dielectric interface varies to produce all combinations of dielectric interface positions.

6. The method of claim 2, wherein one tier of pre-characterized floating random walk domains comprises domains with three dielectric layers of the semiconductor structure in which two dielectric interfaces vary to produce all combinations of dielectric interface positions.

7. The method of claim 2, further comprising, for one tier of pre-characterized floating random walk domains:
   dividing a floating random walk domain in slices of equal height; and
   calculating the weights average permittivity value of each slice.

8. The method of claim 1, further comprising characterizing floating random walk domains that are not part of the database of the pre-characterized domains by obtaining their Green's function and storing the obtained Green's function in the database.

9. The method of claim 1, wherein the floating random walk domains are characterized by their Green's function using Finites Differences method.

10. A circuit design apparatus comprising:
    a memory;
    a processor operable to perform multi-tier domain pre-characterization for floating random walk capacitance extraction of a semiconductor structure comprising one or more dielectric layers by:
       generating a plurality of pre-characterized floating random walk domains;
       obtaining a Green's function of each of the pre-characterized floating random walk domains;
       storing the Green's function of each of the pre-characterized floating random walk domains in the memory; and
       performing a floating random walk procedure using the domains stored in the database, said performing including matching at least one domain during a floating random walk to one of the plurality of pre-characterized domains, said matching including determining which of a smart sweep method, a single dielectric method, a two-dielectric method, a three-dielectric method or an averaging method is most suitable and applying the most suitable method; and
    extracting and verifying a layout of a circuit using the pre-characterized floating random walk domains in the database.

11. The method of claim 10, wherein the plurality of pre-characterized floating random walk domains comprise five tiers according to a number and order of dielectric layers within each domain.

12. The method of claim 11, wherein one tier of pre-characterized floating random walk domains comprises domains with all combinations of all consecutive dielectric layers of the semiconductor structure.

13. The method of claim 11, wherein one tier of pre-characterized floating random walk domains comprises domains with each of the dielectric layers of the semiconductor structure.

14. The method of claim 11, wherein one tier of pre-characterized floating random walk domains comprises domains with two dielectric layers of the semiconductor structure in which a dielectric interface varies to produce all combinations of dielectric interface positions.

15. The method of claim 11, wherein one tier of pre-characterized floating random walk domains comprises domains with three dielectric layers of the semiconductor structure in which two dielectric interfaces vary to produce all combinations of dielectric interface positions.

16. The method of claim 11, further comprising, for one tier of pre-characterized floating random walk domains:
dividing a floating random walk domain in slices of equal height; and
calculating the weights average permittivity value of each slice.

17. The method of claim 10, further comprising characterizing floating random walk domains that are not part of the database of the pre-characterized domains by obtaining their Green's function and storing the obtained Green's function in the database.

18. The method of claim 10, wherein the floating random walk domains are characterized by their Green's function using Finites Differences method.

19. An apparatus comprising:
a memory operable to store a multi-tier database of pre-characterized floating random walk domains; and
a processor configured to:
extract, using a floating random walk method, a semiconductor device comprising multiple conductors embedded in multiple dielectric layers;
match floating random walk domain requests to pre-characterized floating random walk domains in the multi-tier database by determining which of a smart sweep method, a single dielectric method, a two-dielectric method, a three-dielectric method or an averaging method is most suitable and applying the most suitable method; and
characterize floating random walk domains that are not matched in the multi-tier database by their Green's function using a Finites Differences method.

20. The method of claim 19, wherein the plurality of pre-characterized floating random walk domains comprise five tiers according to a number and order of dielectric layers within each domain.

21. The method of claim 20, wherein one tier of pre-characterized floating random walk domains comprises domains with all combinations of all consecutive dielectric layers of the semiconductor structure.

22. The method of claim 20, wherein one tier of pre-characterized floating random walk domains comprises domains with each of the dielectric layers of the semiconductor structure.

23. The method of claim 20, wherein one tier of pre-characterized floating random walk domains comprises domains with two dielectric layers of the semiconductor structure in which a dielectric interface varies to produce all combinations of dielectric interface positions.

24. The method of claim 20, wherein one tier of pre-characterized floating random walk domains comprises domains with three dielectric layers of the semiconductor structure in which two dielectric interfaces vary to produce all combinations of dielectric interface positions.

25. The method of claim 21, further comprising, for one tier of pre-characterized floating random walk domains:
dividing a floating random walk domain in slices of equal height; and
calculating the weights average permittivity value of each slice.

26. The method of claim 19, further comprising characterizing floating random walk domains that are not part of the database of the pre-characterized domains by obtaining their Green's function and storing the obtained Green's function in the database.

27. The method of claim 19, wherein the floating random walk domains are characterized by their Green's function using Finites Differences method.

* * * * *